US011433370B2

(12) United States Patent
Edwards et al.

(10) Patent No.: US 11,433,370 B2
(45) Date of Patent: Sep. 6, 2022

(54) FILL SHEETS AND RELATED FILL PACK ASSEMBLIES

(71) Applicant: Brentwood Industries, Inc., Reading, PA (US)

(72) Inventors: Brian Edwards, Reading, PA (US); Aditya Bhat, Reading, PA (US)

(73) Assignee: BRENTWOOD INDUSTRIES, INC., Reading, PA (US)

( * ) Notice: Subject to any disclaimer, the term of this patent is extended or adjusted under 35 U.S.C. 154(b) by 93 days.

(21) Appl. No.: 17/082,589

(22) Filed: Oct. 28, 2020

(65) Prior Publication Data

US 2021/0187472 A1 Jun. 24, 2021

Related U.S. Application Data

(60) Provisional application No. 62/951,365, filed on Dec. 20, 2019.

(51) Int. Cl.
*B01J 19/32* (2006.01)
*F28C 1/04* (2006.01)

(52) U.S. Cl.
CPC ............... *B01J 19/32* (2013.01); *F28C 1/04* (2013.01); *B01J 2219/32206* (2013.01); *B01J 2219/32244* (2013.01); *B01J 2219/32251* (2013.01); *B01J 2219/3327* (2013.01)

(58) Field of Classification Search
CPC .............. B01J 19/32; B01J 2219/32206; B01J 2219/32244; B01J 2219/32251; B01J 2219/3327; F28C 1/04
USPC .............................. 261/112.1, 112.2, DIG. 72
See application file for complete search history.

(56) References Cited

U.S. PATENT DOCUMENTS

| | | | |
|---|---|---|---|
| 3,540,702 A | 11/1970 | Uyama | |
| 3,733,063 A | 5/1973 | Loetel et al. | |
| 4,361,426 A * | 11/1982 | Carter | F28F 25/087 55/440 |
| 4,548,766 A | 10/1985 | Kinney, Jr. et al. | |
| 4,581,183 A * | 4/1986 | Lefevre | F28F 25/087 156/60 |

(Continued)

FOREIGN PATENT DOCUMENTS

| | | |
|---|---|---|
| GB | 1221073 A | 2/1971 |
| JP | 2014152942 A | 8/2014 |

OTHER PUBLICATIONS

International Search Report and Written Opinion dated Feb. 25, 2021 in International Application No. PCT/US2020/063334.

*Primary Examiner* — Charles S Bushey
(74) *Attorney, Agent, or Firm* — Panitch Schwarze Belisario & Nadel LLP

(57) ABSTRACT

A fill sheet for cooling heat transfer fluid in a cooling tower includes an air intake end, an air outlet end, a top edge and a bottom edge. The air outlet end is positioned opposite the air intake end along a lateral axis. The top edge connects the air intake end and the air outlet end and the bottom edge also connects the air intake end and the air outlet end. The bottom edge is positioned opposite the top edge along a vertical axis. A plurality of flutes extends generally parallel to the lateral axis between the air intake end and the air outlet end. An offset extends generally parallel to the vertical axis. A first flute of the plurality of flutes transitions from a first peak at a first side of the offset to a first valley at a second side of the offset.

18 Claims, 16 Drawing Sheets

(56) References Cited

U.S. PATENT DOCUMENTS

| | | | |
|---|---|---|---|
| 4,657,711 A * | 4/1987 | Wigley | F28F 25/087 |
| | | | 261/112.2 |
| 4,668,443 A | 5/1987 | Rye | |
| 4,800,047 A * | 1/1989 | Monjoie | F28F 25/087 |
| | | | 428/184 |
| 4,801,410 A | 1/1989 | Kinney, Jr. et al. | |
| 5,217,788 A | 6/1993 | Rye | |
| 5,944,094 A * | 8/1999 | Kinney, Jr | F28C 1/14 |
| | | | 261/DIG. 11 |
| 6,206,350 B1 | 3/2001 | Harrison et al. | |
| 6,260,830 B1 | 7/2001 | Harrison et al. | |
| 6,460,832 B1 | 10/2002 | Mockry et al. | |
| 6,869,066 B2 | 3/2005 | Koo | |
| 6,877,205 B2 | 4/2005 | Aull et al. | |
| 7,674,304 B2 | 3/2010 | Krell et al. | |
| 8,561,359 B2 | 10/2013 | Rosten et al. | |
| 8,690,130 B2 | 4/2014 | Kulick, III et al. | |
| 9,170,054 B2 | 10/2015 | Shin et al. | |
| 9,555,390 B2 | 1/2017 | Krell et al. | |
| 9,758,406 B2 | 9/2017 | Kulick, III | |
| 10,386,135 B2 * | 8/2019 | Shin | F28F 25/087 |
| 10,393,441 B2 * | 8/2019 | Yang | B01D 45/08 |
| 2015/0034277 A1 | 2/2015 | Shin et al. | |
| 2016/0223262 A1 | 8/2016 | Shin | |
| 2016/0356549 A1 | 12/2016 | Yang et al. | |
| 2021/0187473 A1 * | 6/2021 | Edwards | B01J 19/32 |

* cited by examiner

FILL SHEETS AND RELATED FILL PACK ASSEMBLIES

CROSS-REFERENCE TO RELATED APPLICATIONS

The present application claims the benefit of U.S. Provisional Patent Application No. 62/951,365, filed on Dec. 20, 2019 and titled "Fill Sheets and Related Fill Pack Assemblies," the entire contents of which is incorporated herein by reference in its entirety.

BACKGROUND OF THE INVENTION

A variety of film fills and fill sheets are available for cross-flow cooling towers that may be assembled together into fill packs. In order to distinguish and create advantages in the marketplace, it is important for a fill manufacturer to offer a product with improvements over competing fill options. Some examples of these advantages include improved tower performance through a higher efficiency fill, ease of installation, product longevity, product cost, and reduction of drift exiting the fill.

The performance of a cooling tower can be characterized by the quantity of water or other cooling fluid that can be cooled to a specified operating temperature for a certain set of ambient conditions. In order to achieve this cooling, water is sprayed onto the cooling tower fill and is exposed to an air flow, thereby causing evaporation of a small portion of water into the air, which cools the remaining water. By increasing the amount of evaporation occurring within the cooling tower, the overall performance of the tower may also be increased or improved. Since most of this evaporation occurs within the fill, changes to the fill design can significantly impact the amount of cooling a tower can achieve during operation. Specifically, changes to a cooling tower fill that reduce the pressure drop across a fill for a given air flow or otherwise improve the thermal performance of the fill, will result in a better performing cooling tower. By reducing the pressure drop across a fill, the resistance to airflow through the tower is decreased, allowing more air to pass over the water film for the same fan power, thereby causing the amount of evaporation to increase. To improve the thermal performance of a fill, increased mixing of the air and water can increase the amount of evaporation of water into the air by improving the conditions at the air-water interface. Generating mixing of the air, however, typically requires changes to the fill which also increases the pressure drop across the fill, indicating the need for fill designs which can either reduce pressure drop over existing designs with minimal impact to mixing or improved strategies for mixing which require equal or less pressure drop.

For cross-flow cooling towers, film fills are installed in the tower as a hanging fill, or as a bottom supported fill. For hanging fills, holes are punched near the top of the fill sheets to accept rails or for mounting on rails where the fill sheets are spaced along the length of the rails. This causes the individual fill sheets to be under tensile loading under the holes, but under compressive loading at the rail-sheet interface. For bottom supported fills, sheets are secured together into rigid blocks of fill, then placed on top of a support structure in the tower. Typically, bottom supported fills are easier to install into towers than hanging fills but the bottom supported fill sheets require additional structural features to resist the compressive loading seen during use, particularly during operation under loading from the water or other cooling fluid utilized in the tower or from the accumulation of external deposits, such as ice, biological foulants, scale or related other accumulated deposits that all apply additional weight and forces onto the fill. These structural features of the fill sheets, such as structural ribs or glue boss features, usually provide little to no thermal benefit for the fill and increase the pressure drop, thereby resulting in reduced tower performance. Alternative to the structural ribs and glue bosses, thicker gauge sheets may be used for the fill construction, however the increase in gauge thickness increases the total cost of the fill by adding more material to each fill sheet.

For film fills used in cross-flow towers, all fills contain a dedicated heat transfer area, while some also contain an integral drift eliminator near the air outlet of the fill and/or a louver section near the air inlet of the fill. The heat transfer area of the fill is responsible for the thermal performance of the fill by providing a large surface area for water to spread out on the surfaces of the fill to increase contact with the air, mixing the air as it flows through the fill and mixing the water film as it flows over the sheets, while maintaining a low pressure drop across the fill. Typically, the heat transfer surface for cross-flow fills consists of fluted fill sheets with small surface features (microstructure) patterned across the surface or fill sheets with more aggressive patterned features and less pronounced flute features. For fills with flutes, the flutes are usually continuous across the heat transfer area or have a generally constant cross-section along their length and are commonly cross corrugated, although may be oriented horizontally or vertically.

Although most of the bulk water adheres to the surface of a film fill, some of the water forms small droplets and escapes the fill through the air outlet, otherwise known as drift. Drift is undesirable, as the drift represents a loss of water or other cooling fluid from the system and the loss of water or other cooling fluid has a cost to replenish, both itself and any treatment chemicals contained within the cooling fluid. The drift may also have a deleterious impact on surrounding equipment and environments since the drift may contain chemicals, salts and bacteria present in the circulating water or fluid. For cross-flow tower film fills, drift elimination features are sometimes included on the air outlet side of the sheet to capture these drift droplets and prevent them from escaping the cooling tower, which are referred to as drift eliminators and may be comprised of integral drift eliminators ("IDs"). For cross-flow film fills, there are typically two different types of drift eliminators which may be integrated, including the tube drift eliminator and the blade drift eliminator. Generally, tube drift eliminators are angled tubes formed into the ID section of the fill by aligning drift corrugations of adjacent sheets. As water droplets enter the tubes entrained in the air stream, the momentum of the droplets causes them to impact the tube wall as the airflow changes direction while following the angled tube of the ID. A vertical channel is typically included at the inlet of the integral drift eliminator tubes to allow water collected on the surface of the integral drift eliminator to drain out of the fill into a lower catch basin, and to provide vertical structural support for bottom supported fills. One limitation of current implementations of this type of drift eliminator is introduced when water reaches the tube inlet of the eliminator. When water reaches the transition between the tube section and the drain, some water may be pushed along part of the top wall of the tube by the air before falling off into the air stream. By introducing droplets farther into the eliminator, it becomes easier for these droplets to escape out of the eliminator without impacting a wall, thereby reducing eliminator performance. Integral blade drift eliminator designs accomplish drift removal by creating a large vertically oriented ridge, near the air outlet of the fill to change the direction of airflow. The momentum of the water droplets at the integral drift eliminator inlet causes an impact with the ridge walls, eliminating the drift from the airstream. Other structural features such as ribs or spacers may be included before or after the eliminator ridge to ensure the sheets remain separated during operation and to stiffen the fill and/or sheet, as well as the assembled fill pack.

At the air inlet of the fill, integral louvers are sometimes included into the fill design to prevent water from splashing out of the front of the fill. These integral louvers are usually comprised of corrugations which are angled downward as they protrude into the fill, to provide a sloped surface for the water to run down, thereby preventing water or other cooling fluid from reaching the front of the fill. The corrugations on each sheet may be assembled together to form tubes or remain parallel to adjacent sheet corrugations with additional sheet spacer features added to the design.

BRIEF SUMMARY OF THE INVENTION

Briefly stated, the preferred invention is directed to a fill sheet for cooling a heat transfer fluid in a cooling tower when assembled into fill packs comprised of pluralities of fill sheets for use in a cross-flow cooling tower. The fill sheet includes an air intake end, an air outlet end positioned opposite the air intake end along a lateral axis, a top edge connecting the air intake end and the air outlet end and a bottom edge connecting the air intake end and the air outlet end. The bottom edge is positioned opposite the top edge along a vertical axis. The heat transfer fluid is configured for flowing between the top edge and the bottom edge. A plurality of flutes extends generally along the lateral axis between the air intake end and the air outlet end. An offset or transition feature provides a flat section of macrostructure and extends generally parallel to the vertical axis. A first flute of the plurality of flutes transitions from a first peak at a first side of the offset to a first valley at a second side of the offset. The offset or transition feature includes a rib extending generally parallel to the vertical axis and a spacer to provide structural support for the offset. Microstructure is preferably integrally formed into the offset and has a generally herringbone shape. The spacer is preferably comprised of a first plurality of spacers, wherein each of the plurality of flutes includes one of the first plurality of spacers positioned thereon at the offset or transition feature. The rib is preferably comprised of an intermediate rib, including a first intermediate rib and a second intermediate rib and the spacer is comprised of an intermediate column of spacers.

In another aspect, the preferred invention is directed to a fill sheet for cooling heat transfer fluid in a cooling tower when arranged into fill packs comprised of pluralities of fill sheets. The fill sheet includes an air intake end, an air outlet end positioned opposite the air intake end along a lateral axis, a top edge connecting the air intake end and the air outlet end and a bottom edge connecting the air intake end and the air outlet end. The bottom edge is positioned opposite the top edge along a vertical axis. A plurality of spacers extends from a heat transfer area of the fill sheet between the air intake end, the air outlet end, the top edge and the bottom edge. The plurality of spacers includes a first spacer having a first head end and a first tail end. The first head end is positioned closer to the top edge than the first tail end. The first spacer defines a first spacer axis. The first spacer axis defines a first acute spacer angle with the lateral axis. The plurality of spacers includes a second spacer having a second head end and a second tail end. The second head end is positioned closer to the top edge than the first tail end. The second spacer defines a second spacer axis. The second spacer axis defines a second acute spacer angle with the lateral axis. The first spacer axis extends at an opposite side of the vertical axis relative to the second spacer axis.

In yet another aspect, the preferred invention is directed to a fill pack for cooling heat transfer fluid in a cooling tower. The fill pack includes a first fill sheet having a first top edge, a first bottom edge and a first heat transfer area between the first top edge and the first bottom edge and a second fill sheet having a second top edge, a second bottom edge and a second heat transfer area between the second top edge and the second bottom edge. A first plurality of spacers extends generally perpendicularly relative to a first sheet plane from the first fill sheet. The first plurality of spacers includes a first spacer having a first head end and a first tail end. The first head end is positioned closer to the first top edge than the first tail end. A second plurality of spacers extends generally perpendicularly relative to a second sheet plane from the second fill sheet. The second plurality of spacers includes a second spacer having a second head end and a second tail end. The second head end is positioned closer to the second top edge than the second tail end. The first head end is positioned proximate the second head end in an installed configuration. A vertical axis is defined generally perpendicularly relative to the first and second top edges and the first and second bottom edges. The first tail end extends toward an opposite side of the vertical axis relative to the second tail end.

In a further aspect, the preferred invention is directed to a fill pack for cooling heat transfer fluid in a cooling tower. The fill pack includes a first fill sheet having a first air intake side, a first top edge, a first air outlet side and a first heat transfer area between the first air intake side and the first air outlet side and a second fill sheet having a second air intake side, a second top edge, a second air outlet side and a second heat transfer area between the second air intake side and the second air outlet side. An integral drift eliminator is associated with the first and second air outlet sides in an installed configuration. The drift eliminator defines a plurality of tubes with a drift eliminator inlet positioned proximate the first and second heat transfer areas and a drift eliminator outlet spaced away from the first and second heat transfer areas. The plurality of tubes extends generally toward the first and second top edges from the drift eliminator inlet toward the drift eliminator outlet. Each of the plurality of tubes includes a blocking structure at the drift eliminator inlet configured to block heat transfer fluid at the drift eliminator inlet to promote droplet formation and capture of the heat transfer fluid in the drift eliminator.

In an additional aspect, the preferred invention is directed to a fill sheet for cooling heat transfer fluid in a cooling tower when assembled into fill packs comprised of pluralities of fill sheets. The fill sheet includes an air intake end, an air outlet end positioned opposite the air intake end along a lateral axis, a top edge connecting the air intake end and the air outlet end and a bottom edge connecting the air intake end and the air outlet end. The bottom edge is positioned opposite the top edge along a vertical axis. A microstructure is formed on the fill sheet. A support rib extends between the top edge and the bottom edge. The support rib includes a first support rib and a second support rib. The first and second support ribs are spaced laterally from each other along the lateral axis and extend substantially parallel to the vertical axis. The support rib has a first support rib portion having a first support rib length. The first support rib includes a first rib height and the second support rib including a second rib height. The microstructure has a microstructure height. The first rib height is less than the microstructure height in the first support rib portion and the second rib height is greater than the microstructure height in the first support rib portion. The support rib is preferably comprised of an outlet side rib positioned proximate the air outlet end. The first support rib portion preferably has a first support rib portion length. In the preferred embodiment, the first rib height may be comprised of a rib minimum height and the second rib height may be comprised of a rib maximum height with the rib height transitions between the rib maximum heights and the rib minimum heights.

In a further aspect, the preferred present invention is directed to a fill sheet for cooling heat transfer fluid in a cooling tower when assembled into fill packs comprised of pluralities of fill sheets. The fill sheet includes an air intake end, an air outlet end positioned opposite the air intake end along a lateral axis, a top edge connecting the air intake end and the air outlet end and a bottom edge connecting the air intake end and the air outlet end. The bottom edge is positioned opposite the top edge along a vertical axis. A plurality of ribs positioned generally between the air intake end and the air outlet end. An intermediate rib is positioned generally between the air intake end and the air outlet end. The intermediate rib includes a first intermediate rib and a second intermediate rib. The first intermediate rib extends from a top end proximate the top edge to first end. The second intermediate rib extends from a bottom end proximate the bottom edge to a second end. The second rib includes the second end and a third end. The first end is positioned proximate the second end. An offset extends generally parallel to the vertical axis. A first flute of a plurality of flutes transitions from a first peak at a first side of the offset to a first valley at a second side of the offset. The intermediate rib is positioned at the offset. The first end of the first rib is positioned proximate the second end of the second rib. At least one of the first and second ribs are intersected by the lateral axis between the top end and the third end. The first and second ribs are preferably spaced at a lateral spacing that is between one-quarter and two inches (¼-2"). The first and second ribs of the preferred embodiments may be comprised of any one of intake side ribs, outlet side ribs or intermediate ribs. The first rib may be comprised of a first intermediate rib segment and the second rib may be comprised of a second intermediate rib segment, therein a first end and a second end are positioned proximate a middle of the fill sheet in the preferred embodiment.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
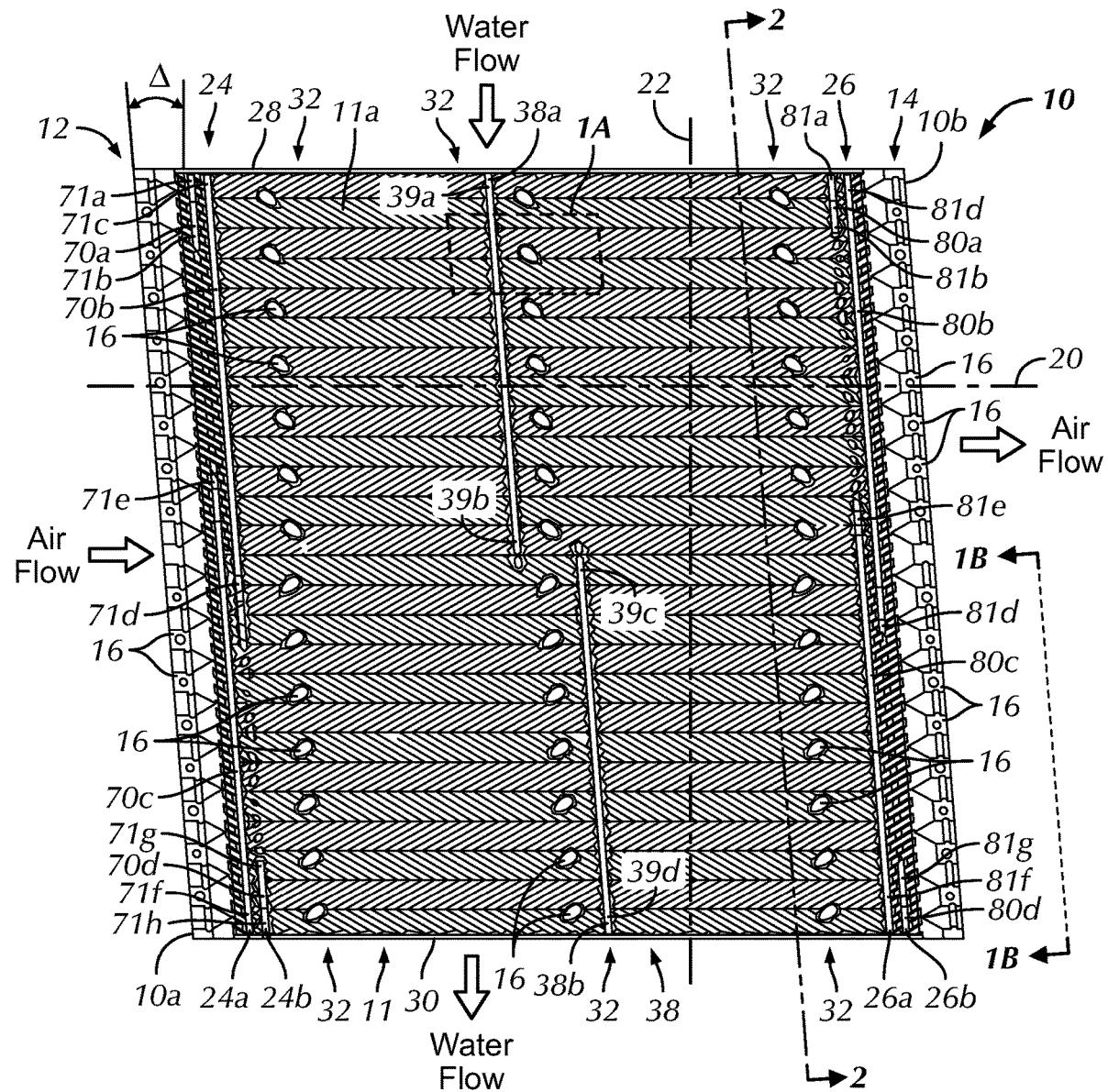
FIG. 1 is a front elevational view of a fill sheet in accordance with a first preferred embodiment of the present invention.
Figure 1A:
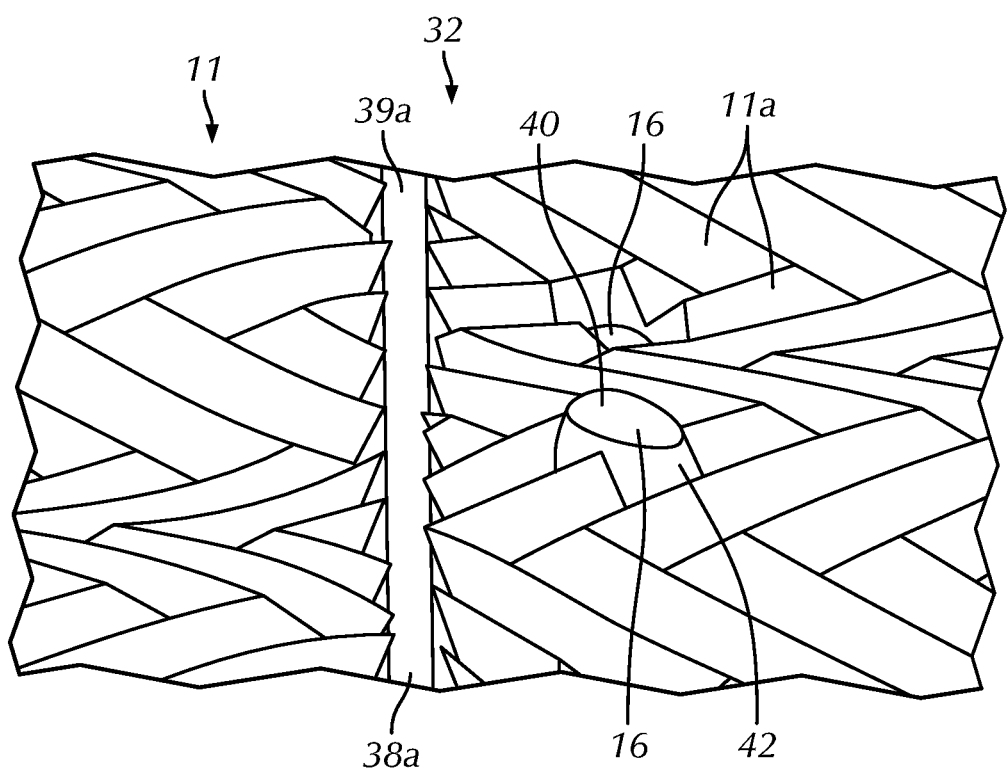
FIG. 1A is a magnified front perspective view of a portion of the fill sheet of FIG. 1, taken from within shape 1A of FIG. 1.
Figure 1B:
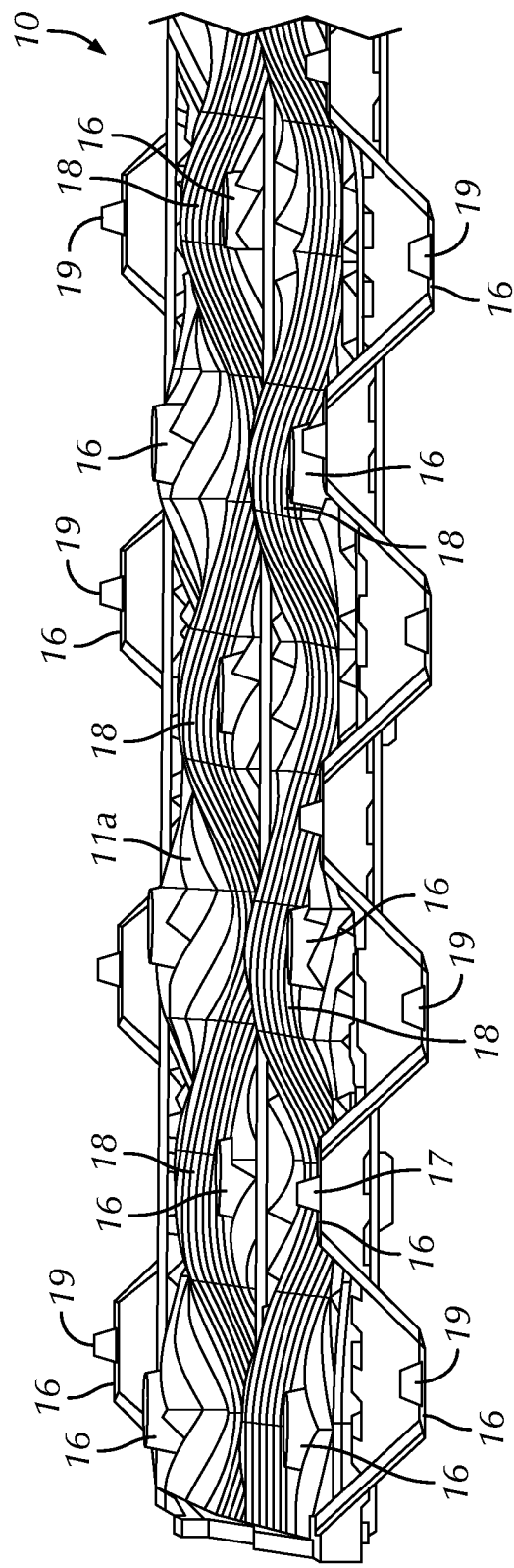
FIG. 1B is a side perspective view of the fill sheet of FIG. 1, taken along the line 1B-1B of FIG. 1.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" "front" or "rear" and "outwardly" or "proximally" refer to directions toward and away from, respectively, the geometric center or orientation of the fill sheets or fill packs and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-3C, a fill sheet, generally designated 10, in accordance with a first preferred embodiment of the present invention has a heat transfer section 11, along with an air inlet portion 12, which may include an integral louver (not shown), an air outlet portion 14, which may include an integral drift (See FIGS. 7-9), and/or other standard end features at the inlet portion 12 and/or the outlet portion 14, as well as additional features, such as intermediate honeycombs. The fill sheet 10 is not limited to including the integral louver or the integral drift, neither of which are shown in the first preferred embodiment of the fill sheet 10, and may function without the louver and drift or may include alternative features attached to, integrally formed with, positioned adjacent to or abutting the air inlet and outlet portions 12, 14, such as non-integral louvers and drift that abut, but are not integrally formed with the fill sheet 10. The air inlet portion 12 of the first preferred fill sheet 10, which may include an integral louver, is positioned at the air intake side 10a of the sheet 10 and the air outlet portion 14, which may include an integral drift, is positioned at the air outlet side 10b of the preferred cross-flow fill sheet 10.

The heat transfer section 11 of the first preferred fill sheet 10 includes a herringbone-shaped microstructure 11a or the microstructure 11a has a generally herringbone shape to increase the surface area of the fill sheet 10 in the heat transfer section 11 and provide mixing of the air and water during operation. The microstructure 11a is not limited to being comprised of the herringbone-shaped microstructure and may be comprised of alternatively sized and shaped microstructure that increases the surface area of the fill sheet 10 in the heat transfer section 11 to expose additional water film area to the airflow. The microstructure 11a preferably has a smaller microstructure height $H_s$ when compared to the height of the macrostructure of the preferred fill sheet 10, wherein the macrostructure includes features such as the plurality of flutes 18, as is described in greater detail below. In the preferred embodiments, the microstructure height $H_s$ is three hundredths of an inch to one-half inch (0.03-0.5") but is not so limited and may fall outside this range depending on designer preferences, microstructure type, cooling tower type, expected loading and related design considerations and preferences. The microstructure height $H_s$, however, of the preferred microstructure 11a is within the preferred range of the microstructure height $H_s$ and is adaptable for use with the preferred fill sheets 10.

The heat transfer section 11 of the fill sheet 10 also includes a spacer 16, which may be comprised of pluralities of spacers 16. The spacers 16 may be comprised of glue bosses, peg spacers or other similar structures or features that space the fill sheets 10, 9a, 9b from each other in the assembled or installed configurations. The spacers 16 preferably extend from opposing front and rear surfaces of the fill sheet 10 and mate with opposing spacers 16 on adjacent fill sheets 10, but are not so limited and may be configured to extend from only a single surface of the fill sheet 10 or may be otherwise sized and configured to space the fill sheets 10 in the assembled configurations. The spacers 16 on the adjacent fill sheets 10 in an assembled configuration are also preferably comprised of mating glue bosses or peg spacers that facilitate spacing of the assembled fill sheets 10 relative to each other. The spacers 16 are not limited to mating glue bosses or peg spacers and may be comprised of nearly any feature of the fill sheets 10 that facilitates spacing of the adjacent fill sheets 10 relative to each other in the assembled configuration, including suspension or hanging of the fill sheets 10 next to each other at predetermined spacing intervals or distances during operation. The spacers 16 may assist in joining or bonding the adjacent fill sheets 10 together in the assembled configuration or may provide general spacing between the adjacent fill sheets 10 in the assembled configuration. The configuration and operation of the spacers 16 are described in greater detail below. The fill sheets 10 of the preferred embodiments may also include spacers 16 with alignment or connection features 19 extending therefrom. The spacers 16 preferably provide a surface for mating with a spacer 16 from an adjacent fill sheet 10 to appropriately space a first fill sheet 9a from a second fill sheet 9b in the assembled or installed configuration. The alignment or connection features 19 preferably facilitate proper alignment of the first sheet 9a relative to the second sheet 9b and/or provide for engagement or connection of the adjacent fill sheets 10 in the assembled or installed configuration.

The heat transfer section 11 of the fill sheet 10 further includes flutes 18 arranged thereon that generally extend parallel or substantially parallel to a lateral axis 20 of the fill sheet 10. The lateral axis 20 extends generally horizontally in an installed configuration of the fill sheets 10 and is oriented generally perpendicular to a vertical axis 22. The flutes 18 preferably guide the airflow through the heat transfer area 11, generally along the lateral axis 20 from the intake side 10a to the outlet side 10b.

The first preferred fill sheet 10 also includes an improved rib configuration for vertical and lateral rigidity and strength of the fill packs in the assembled configuration, including intake side ribs 24 and outlet side ribs 26 that extend generally parallel to the air intake side 10a and air outlet side 10b, respectively. The intake side ribs 24 and the outlet side ribs 26 are preferably integrally formed in the fill sheet 10 proximate the air intake side 10a and the air outlet side 10b, respectively and adjacent to the heat transfer area 11 or within the heat transfer area 11. The intake side ribs 24 and the outlet side ribs 26 are described in greater detail below.

Figure 7:
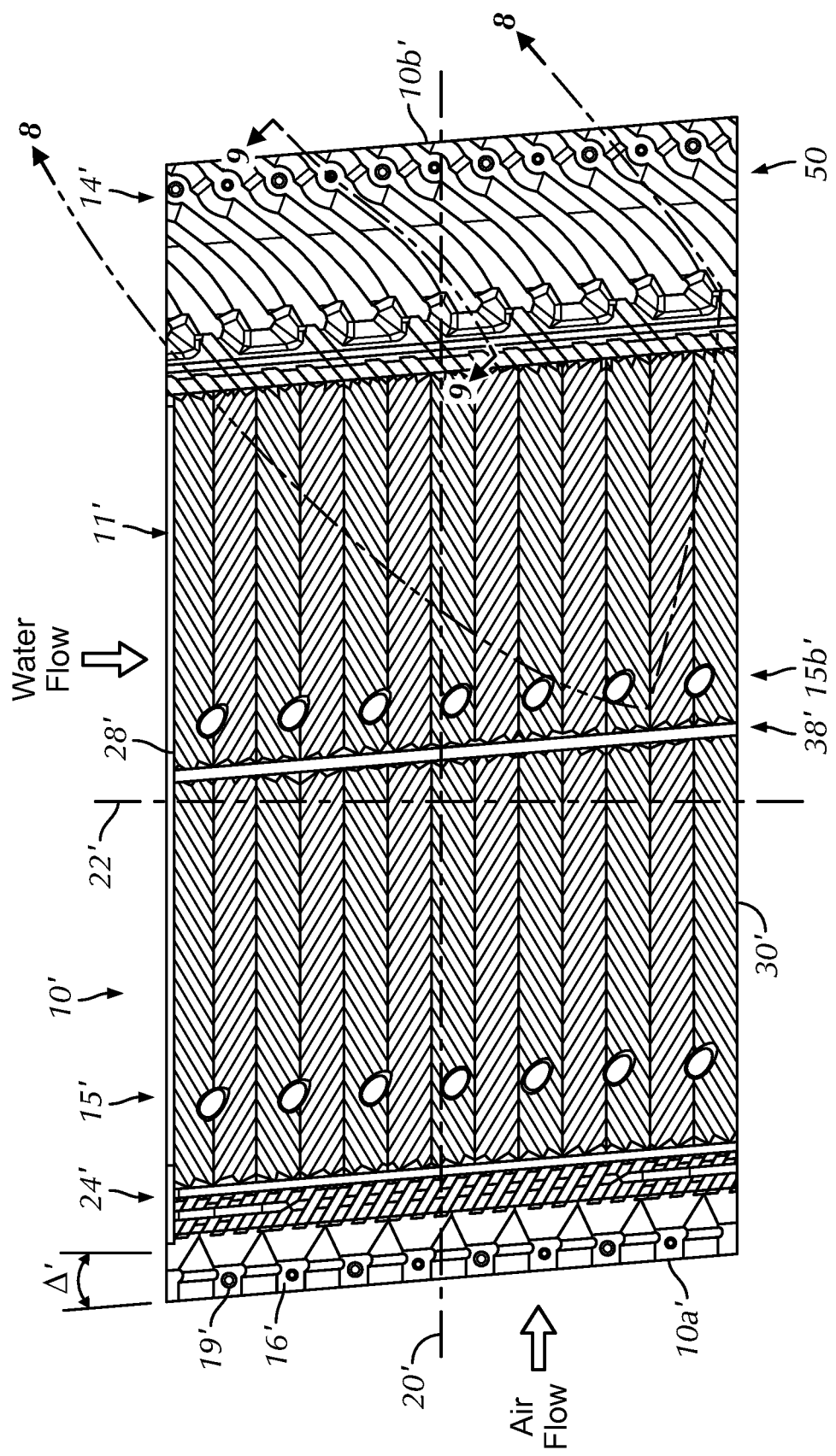
FIG. 7 is a front elevational view of a fill sheet in accordance with a second preferred embodiment of the present invention, which includes an integrated drift eliminator at an air outlet side of the fill sheet.
Figure 8:
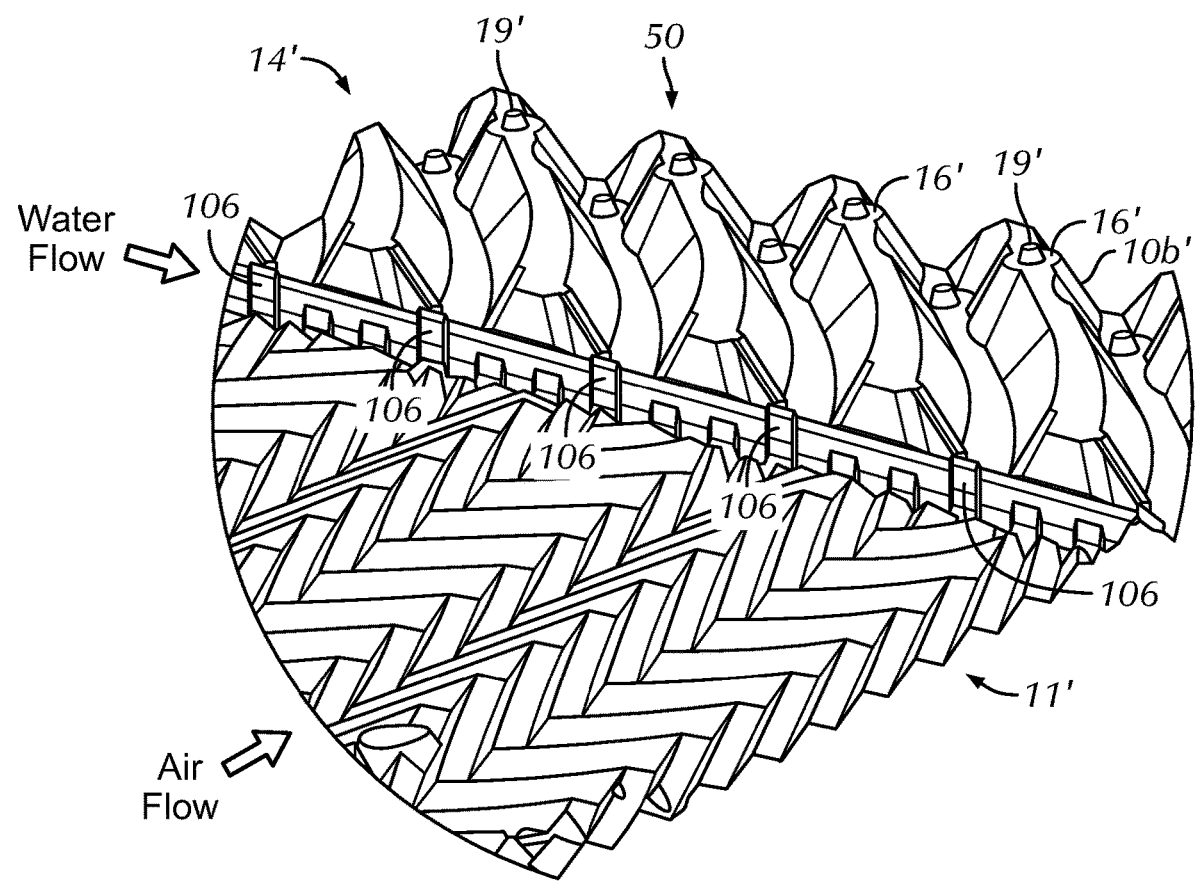
FIG. 8 is a front perspective view of the fill sheet of FIG. 7, taken from within shape 8-8 of FIG. 7.
Figure 9:
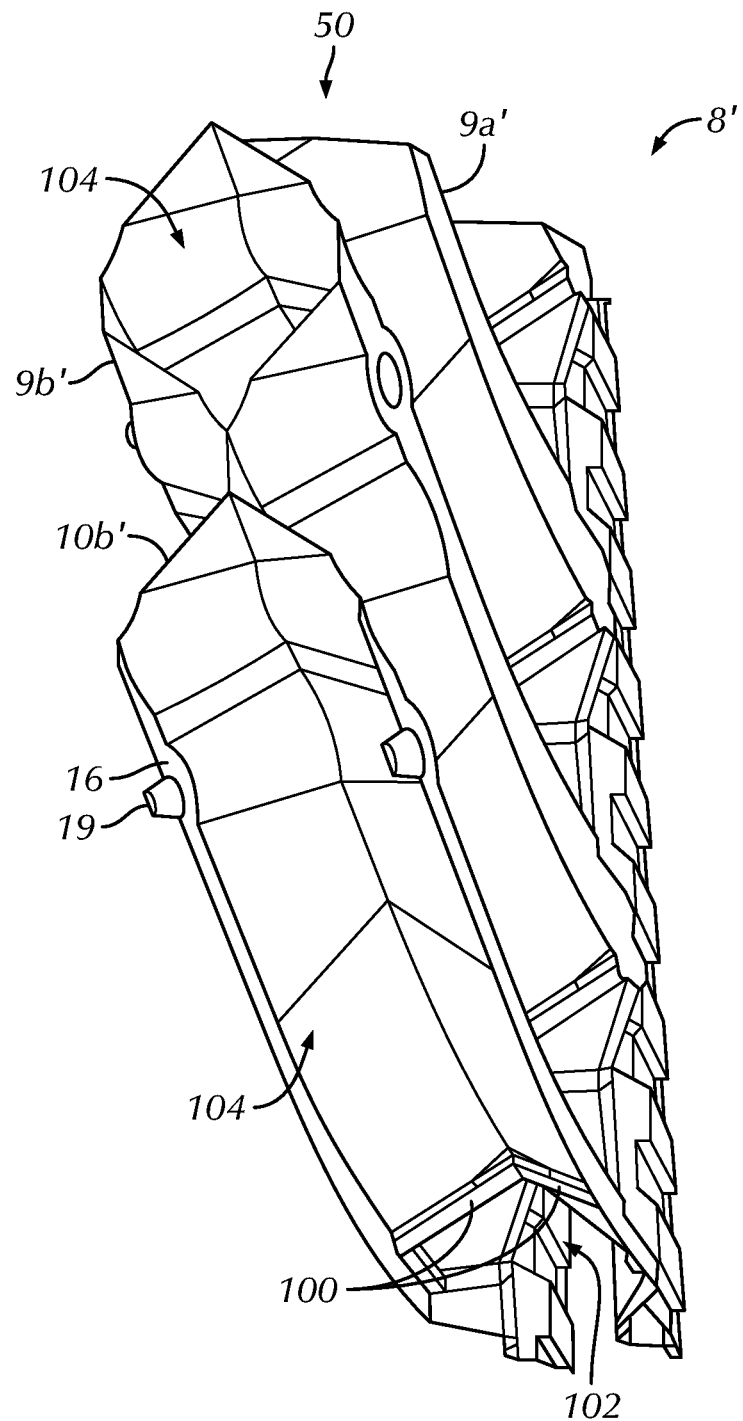
FIG. 9 is a cross-sectional view of a portion of a pair of fill sheets installed or assembled together to define a fill pack, taken along line 9-9 of FIG. 7 and generally showing a flute of a drift eliminator and connection of the drift eliminator flute to a cooling section of the fill sheets.

Referring to FIGS. 7-9, in a second preferred embodiment, a fill sheet 10' has similar features to the first preferred fill sheet 10 and the same reference numerals are utilized to identify similar or the same features, with a prime symbol (') utilized to distinguish the features of the second preferred embodiment from the first preferred embodiment. The second preferred fill sheet 10' includes an integral drift eliminator 50 that improves upon known tube based integral drift eliminators (not shown) by introducing a blocking structure 100 to improve drift performance, as is described greater detail below.

Referring to FIGS. 1 and 7, in the first and second preferred embodiments, the fill sheets 10, 10' are oriented in the cooling tower and configured at a forward lean or to have a pack angle Δ, Δ' of approximately five to ten (5-10) degrees in order to offset the effects of the crossing airflow on the vertically flowing water on the fill sheet surfaces during operation. As the water flows down the sheets 10, 10', generally parallel to the vertical axis 22, 22', the air tends to push the water toward the air outlet side 10b, 10b' of the fill sheets 10, 10' due to friction at the air-water interface. The fill sheets 10, 10', thereby lean into the direction of air flow, generally along the lateral axis 20, 20' such that a top front corner of the fill sheets 10, 10' near the intersection of the air intake side 10a, 10a' and a top edge 28, 28' is positioned closest to the air inlet of the tower. The lower front corner of the fill sheets 10, 10' near the intersection of the air intake side 10a, 10a' and a bottom edge 30, 30' is the portion of the air intake side that is positioned furthest from the air inlet of the tower.

Referring to FIGS. 1-3C, the heat transfer area 11 of the fill sheet 10 is comprised of the herringbone-shaped microstructure 11a formed over the flutes 18 and covers a majority of the interior of the fill sheet 10. The geometry of the flutes 18 is generally comprised of individual flutes 18 oriented substantially in the air travel direction or generally parallel to the lateral axis 20. The fill sheets 10 also preferably include transition features 32, which may be comprised of offsets 32 in the flutes 18. The transition features 32 preferably provide a generally flat macrostructure extending generally parallel to the vertical axis 22 or pitched by the pack angle Δ, Δ' from the vertical axis 22. A first flute 18 of the plurality of flutes 18 transitions from the flat section of the transition feature 32 to the arcuate macrostructure spaced from the transition feature 32 (See FIG. 1C). The flat section preferably includes a rib or support 38 extending generally parallel to the vertical axis 22 and a spacer 16 to provide lateral support for the rib or support 38. The spacer 16 is preferably positioned proximate the rib or support 38 to provide lateral support for the rib or support 38 and is not limited to being positioned in the flat section or transition feature 32 but is preferably positioned proximate the rib or support 38 to provide lateral support. The spacer 16 is preferably comprised of a first plurality of spacers 16 along or at the offset 32, wherein each of the plurality of flutes 18 is associated with or includes one of the first plurality of spacers 16 positioned thereon at the offset, flat section or transition feature 32. The pluralities of spacers 16 of the first preferred fill sheet 10 are positioned at each of the offsets 32 proximate the air intake side 10a, proximate the air outlet side 10b, and proximate the intermediate vertical ribs 38, respectively.

Figure 1C:
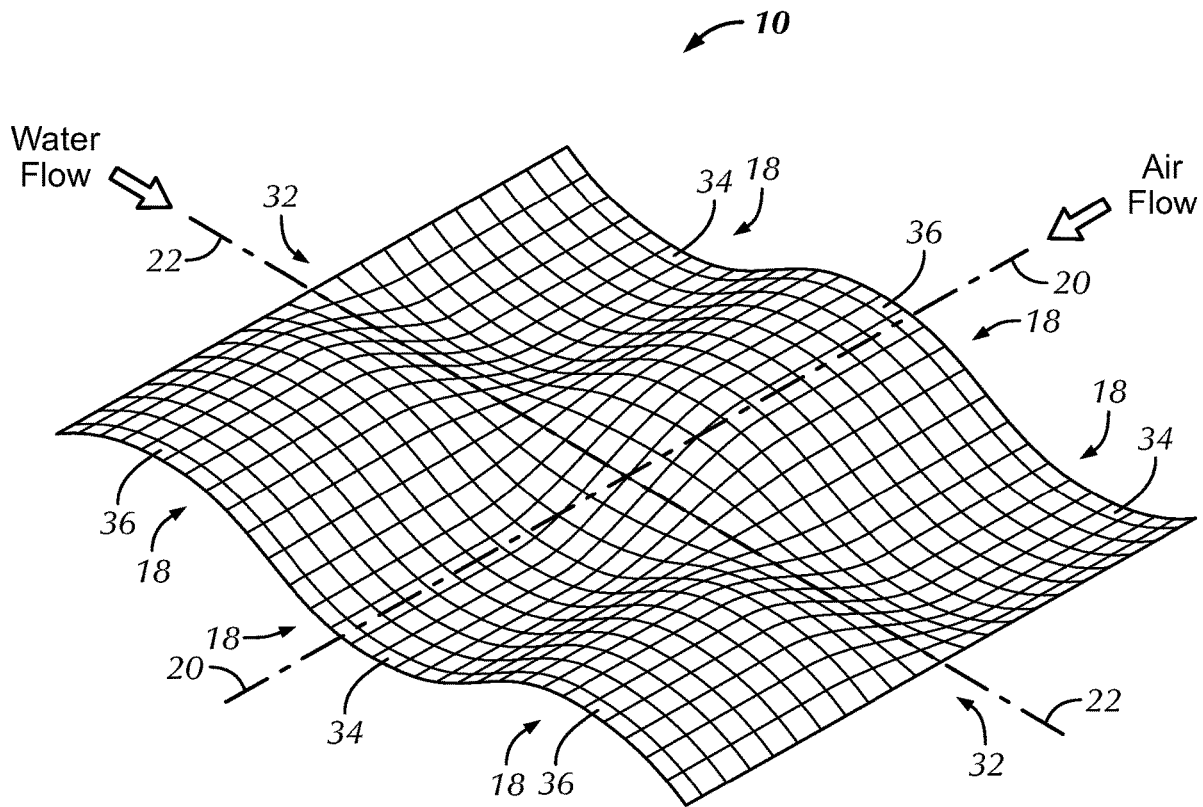
FIG. 1C is a wireframe front perspective view of a portion of the fill sheet of FIG. 1, representing undulating flutes and offsets of the fill sheet.
Figure 3:
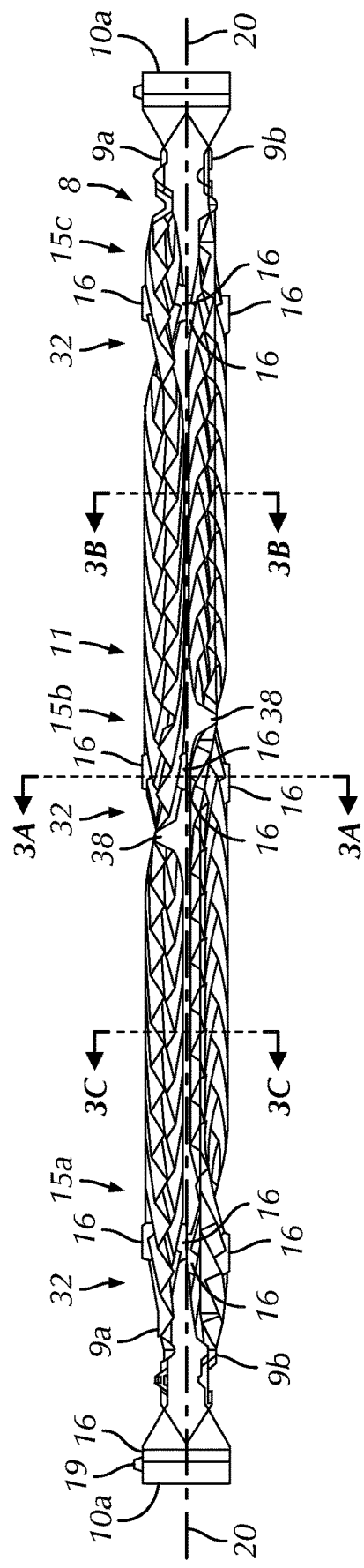
FIG. 3 is a bottom plan view of a pair of fill sheets of FIG. 1 installed or assembled together to define a fill pack.
Figure 3A:
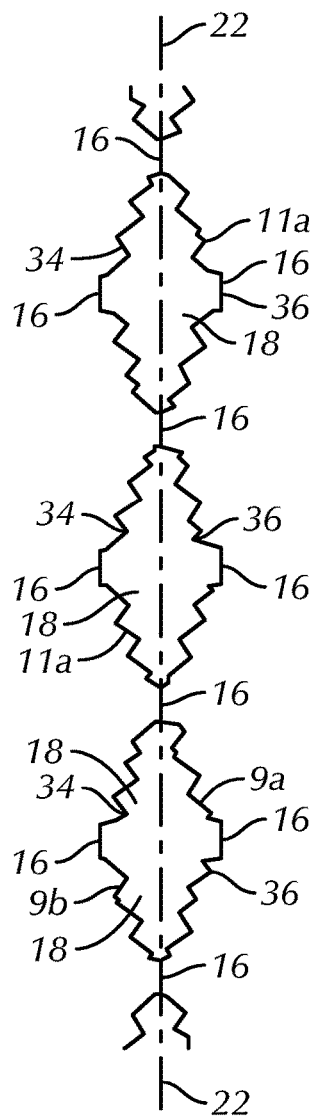
FIG. 3A is a cross-sectional line view of the fill pack of FIG. 3, taken along line 3A-3A of FIG. 3.
Figure 3B:
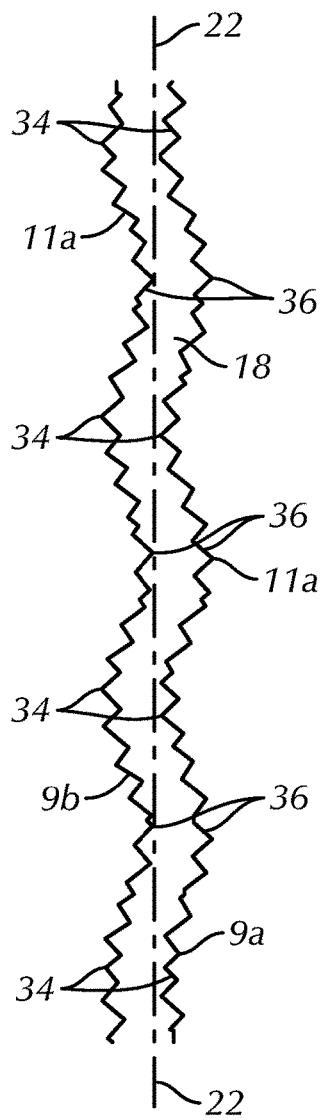
FIG. 3B is a cross-sectional line view of the fill pack of FIG. 3, taken along line 3B-3B of FIG. 3.
Figure 3C:
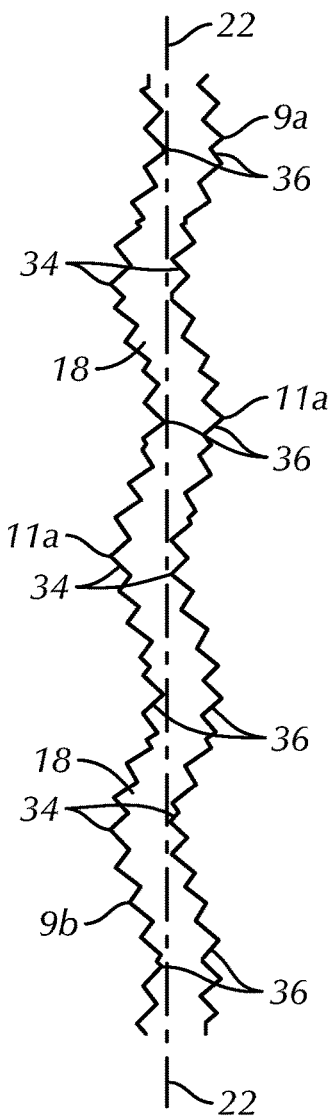
FIG. 3C is a cross-sectional line view of the fill pack of FIG. 3, taken along line 3C-3C of FIG. 3.
Figure 4:
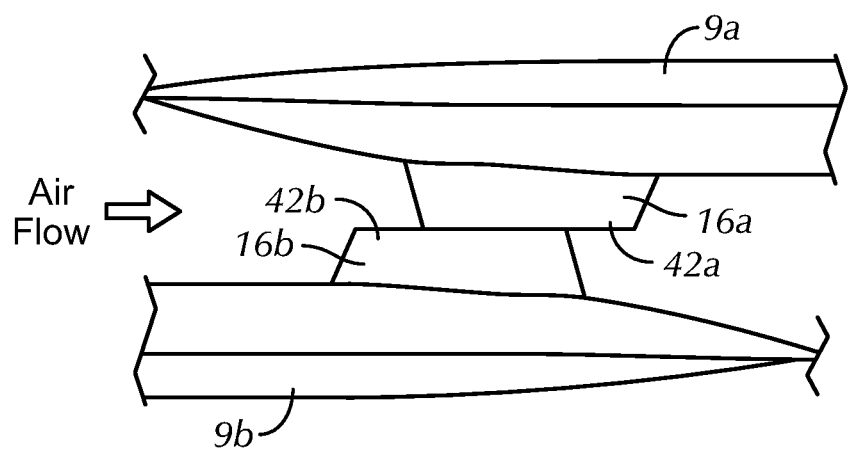
FIG. 4 is a magnified bottom plan view of a portion of the fill pack of FIG. 3, wherein spacers of the fill sheet are shown in an installed or assembled configuration.

The preferred fill sheets 10 include several intermediate offsets 32 in the flutes 18 where the peaks 36 of the flutes 18 transition to valleys 34, and vice versa, generally along the air flow direction or the lateral axis 20. The offsets or transition features 32 are typically positioned proximate to the columns of spacers 16 such that two adjacent fill sheets 10, such as the first and second fill sheets 9a, 9b (FIGS. 3-3C) may be connected together or positioned next to each other to define a fill pack 8. The first preferred fill sheets 10 and the fill pack 8 of FIGS. 1C and 3-3C show the transition of the peaks 36 to the valleys 34 and the valleys 34 to the peaks 36 on opposite sides of the offsets or transition features 32 in the direction of the lateral axis 20, thereby creating a generally parallel orientation of the adjacent first and second fill sheets 9a, 9b in the heat transfer area 11. The position of the offsets 32 in the air travel direction or generally parallel to the lateral axis 20 is staggered between the adjacent first and second fill sheets 9a, 9b for any given vertical position on the fill pack 8. By staggering the offsets 32, a majority of the profiles of the flutes 18 for the fill pack 8 is parallel (FIGS. 3C and 3D) to the adjacent first and second sheets 9a, 9b, while short segments of the fill pack 8 between sets of offsets 32 have an opposing profile or adjacent peaks 36 to valleys 34 in the offsets 32 of the adjacent sheets 9a, 9b (FIG. 3B), thereby providing a location for spacers 16 to be incorporated into the design without significantly protruding into the airstream of the flutes 18 and contributing to pressure drop. This first preferred configuration of the flutes 18 provides an advantage over prior tube-based flute arrangements by allowing the majority of the profiles of the flutes 18 of the fill pack 8 to remain generally parallel to and between the adjacent sheets 9a, 9b, thereby reducing areas of restricted air flow between the peaks 36 and valleys 34 of adjacent sheets 9a, 9b of the fill pack 8. The staggered offsets 32 also create a short tube region within the fill pack 8, which offers structural advantages over a flute design that only consists of parallel flute profiles. By providing short segments proximate the offsets 32 where the flutes 18 are aligned into a tube configuration with the peaks 36 and valleys 34 of the adjacent sheets 9a, 9b generally aligning in the offsets 32, the lateral stiffness of the fill pack 8 is increased, without the need for large spacer features intruding into the airflow region. In addition, the transition regions on either side of the tube structure of the offsets 32 provide a generally flat section to add vertical ribs or supports, such as intermediate vertical ribs or supports 38 without cutting through the profile of the flutes 18. The intermediate vertical ribs or supports 38 strengthen the fill pack 8 without significantly increasing the pressure drop across the fill pack 8 between the air intake side 10a and the air outlet side 10b.

Referring to FIGS. 3 and 4-6, in addition to the improved geometry of the flutes 18 in the fill pack 8 of the first preferred embodiments used in the cross-flow fill design, improvements have been made to the spacers 16 used to space the adjacent fill sheets 9a, 9b apart to define the fill packs 8. The first preferred embodiment of the spacers 16 has a generally angled teardrop or raindrop shaped spacer 16, at least in the heat transfer area 11 where the microstructure 11a is formed on the fill sheets 10. In an installed configuration, a first spacer 16a of the first fill sheet 9a mates with and is joined, positioned in facing engagement or positioned proximate to a second spacer 16b on the second, adjacent fill sheet 9b to space the first and second fill sheets 9a, 9b at a predetermined distance from each other and may facilitate joining or connection of the adjacent fill sheets 9a, 9b. The preferred fill sheets 9a, 9b have a plurality of spacers 16 that extend from both opposing faces of the fill sheets 9a, 9b to mate with adjacent fill sheets 9a, 9b, 10 in the installed configuration. As a non-limiting example, the first preferred fill sheets 9a, 9b, 10 have three columns of fourteen (14) spacers 16 proximate a middle of the fill sheets 9a, 9b, 10 along the offsets 32 and the air intake and air outlet sides 10a, 10b, respectively. The fill sheets 9a, 9b also include pluralities of spacers 16 positioned adjacent the air intake and air outlet sides 10a, 10b with the alignment or connection features 19 thereon. The three columns of spacers 16 include an intermediate column of spacers 15b, an air intake side column of spacers 15a and an air exit side column of spacers 15c. In the first preferred embodiment, the air intake side column of spacers 15a is positioned at an air intake side offset 32, the intermediate column of spacers 15b is positioned at an intermediate offset 32 and the air exit side column of spacers 15c is positioned at an air exit side offset 32. The intermediate column of spacers 15b is positioned between a first intermediate rib 38a and a second intermediate rib 38b at the intermediate offset 32. The first intermediate rib 38a is positioned between the intermediate column of spacers 15b and the air intake side 10a and the second intermediate rib 38b is positioned between the intermediate column of spacers 15b and the air exit side 10b. The fill sheets 9a, 9b, 10 are not limited to including the fourteen (14) spacers 16 in each of the columns of spacers 15a, 15b, 15c or to the specific locations shown in the preferred embodiments and may include more or less spacers 16, depending on the size of the fill sheets 9a, 9b, 10, the expected loading on the fill sheets 9a, 9b, 10, the expected environment, designer preferences and related factors. The fill sheets 9a, 9b, 10 may include nearly any number of spacers 16 that facilitate spacing or joining of the adjacent sheets 9a, 9b, 10 together in the installed configuration, are able to withstand the normal operating conditions of the spacers 16 and perform the functions of the spacers 16, as described herein.

In the first preferred embodiment, each of the spacers 16 includes a generally wider and relatively semi-circular shaped head end 40 and a narrower tail end 42. The first spacer 16a includes a first head end 40a and a first tail end 42a and the second spacer 16b includes a second head end 40b and a second tail end 42b. The head ends 40 and the tail ends 42 define the teardrop or raindrop shape of the spacer 16, wherein the tail ends 42, 42a, 42b are generally rounded, particularly in comparison to a traditional teardrop or raindrop shape. In the installed configuration, the head ends 40 of adjacent spacers 16 generally mate and provide surfaces for joining the spacers 16 and the tail ends 42 extend away from each other in the installed configuration, generally to opposite sides of the vertical axis 22. The tail ends 42 of the first preferred embodiment extend away from the head ends 40 along a spacer axis 17. In the first preferred embodiment, the first spacer 16a includes a first spacer axis 17a and the second spacer 16b includes a second spacer axis 17b. The first and second spacer axes 17a, 17b preferably define first and second acute spacer angles Ωa, Ωb, respectively, with the lateral axis 20 that are approximately ten to eighty degrees (10-80°), but are not so limited and may take on nearly any acute angle that facilitates performance of the functioning of the spacers 16 and withstands the normal operating conditions of the spacers 16, such as within the range of approximately twenty to fifty degrees (20-50°) or approximately thirty-five degrees (35°). The first spacer axis 17a preferably extends at a first side of the vertical axis 22 and the second spacer axis 17b preferably extends at a second, opposite side of the vertical axis 22, such that the first and second spacer axes 17a, 17b extend at opposite sides of the vertical axis 22. This extension of the first and second spacer axes 17a, 17b at opposite sides of the vertical axis 22 results in the first and second tail ends 42a, 42b being spaced from each other in an installed configuration such that cooling fluid generally does not collect at and bridge between the first and second tail ends 42a, 42b, particularly if they were to substantially mate. The first spacer axis 17a preferably extends from a central portion of the first head end 40a through a central portion of the first tail end 42a and the second spacer axis 17b preferably extends from a central portion of the second head end 40b through a central portion of the second tail end 42b, even if the first and second spacers 16a, 16b have some curvature to the tail ends 42a, 42b and is not necessarily straight or uniformly shaped. The first and second spacer axes 17a, 17b also preferably define a separation angle μ measured between the first and second acute spacer angles Ωa, Ωb across the vertical axis 22. The separation angle μ is preferably between approximately twenty and one hundred sixty degrees (20-160°), preferably approximately one hundred twenty degrees (120°). The separation angle μ plus the first and second spacer angles Ωa, Ωb preferably sum to one hundred eighty degrees (180°).

Figure 5:
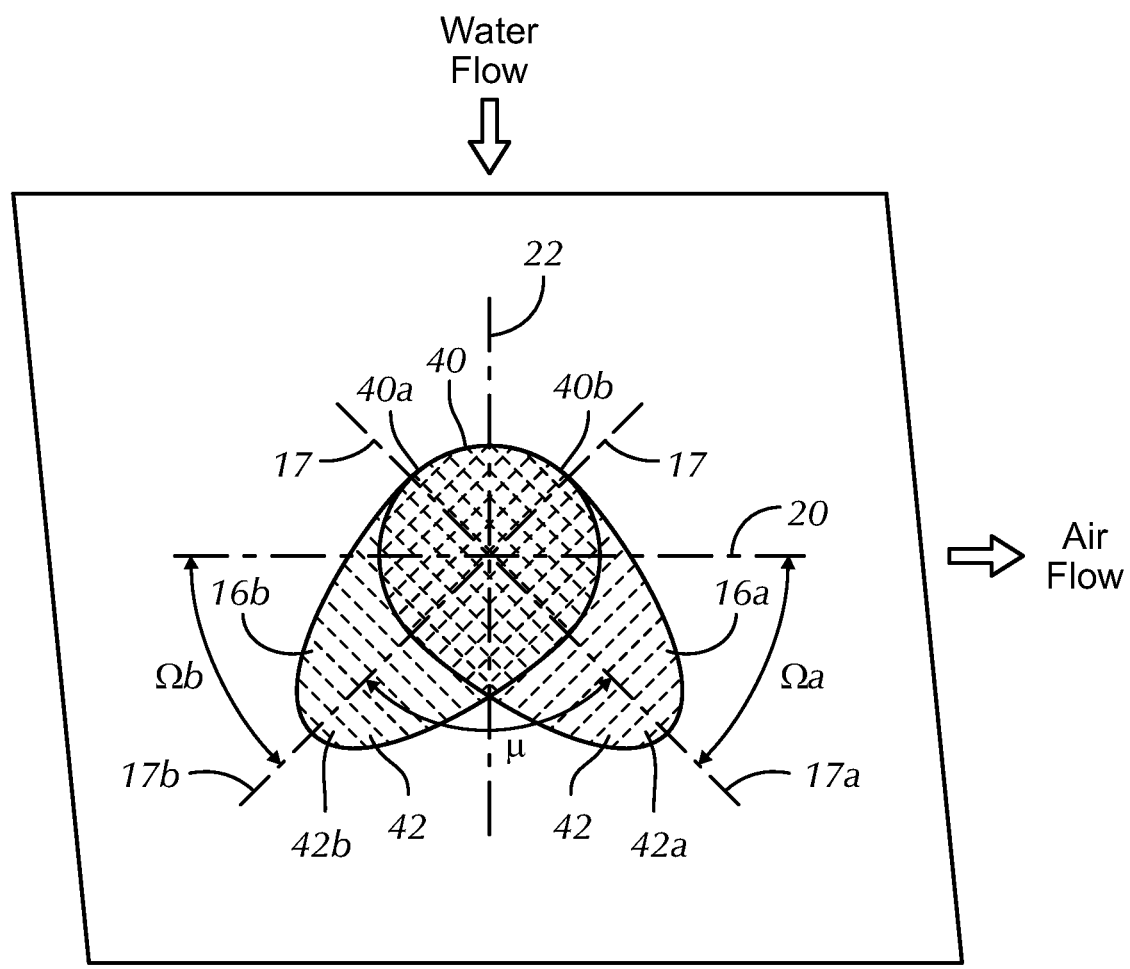
FIG. 5 is a front elevational representation of the shapes of the spacers of FIG. 4.
Figure 6:
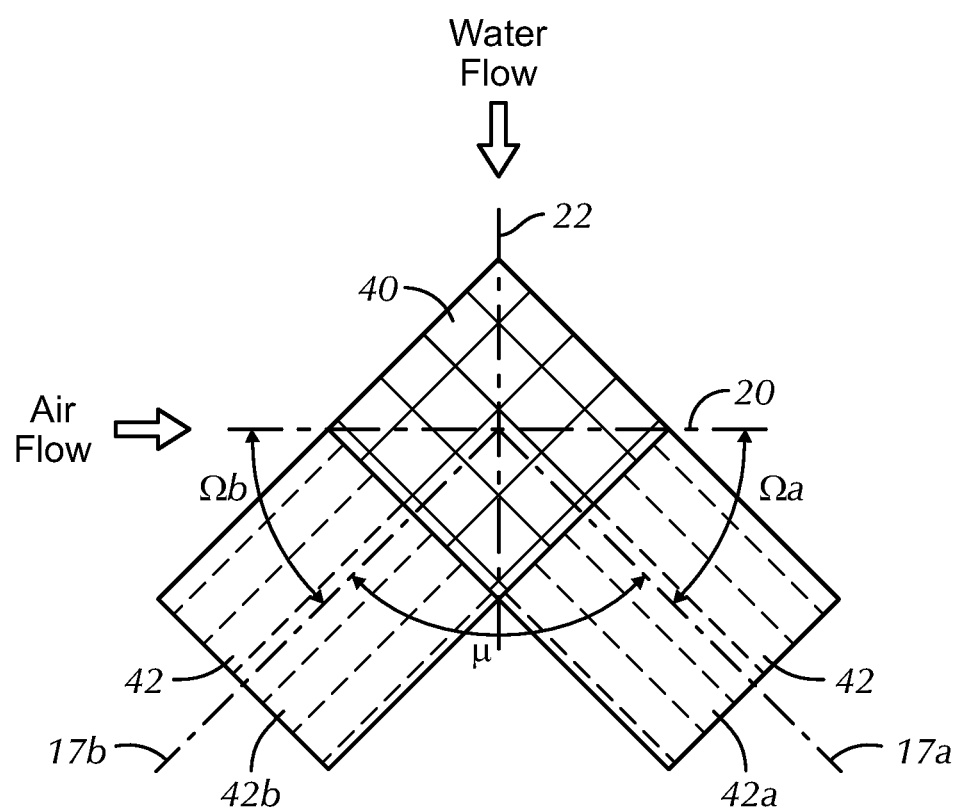
FIG. 6 is a front elevational representation of alternative shapes for the spacers of FIG. 4.

In the first preferred embodiment, adjacent spacers 16, such as the first and second spacers 16a, 16b, are oriented with their tail ends 42a, 42b extending in opposite directions or to opposite sides of the vertical axis 22, thereby forming an upside down V-shape when viewed from the front or rear (FIGS. 5 and 6). This mis-alignment of the tail ends 42, 42a, 42b allows water, which hits the head ends 40, 40a 40b of the pair of spacers 16, 16a, 16b, to run down the sloped side surfaces of each of the spacers 16, 16a, 16b and separate near the tail ends 42, 42a, 42b of the spacers 16, 16a, 16b. In contrast, prior art glue bosses that fully align and have generally the same size and shape result in the water or other cooling fluid flowing over the prior art glue bosses and forming a film of water below the connection, which spans between the two associated fill sheets and impedes airflow. The inverted V shape formed by the tail ends 42, 42a, 42b of the adjacent spacers 16, 16a, 16b is the preferred shape to provide a contact surface to space adjacent fill sheets 10, 9a, 9b and to prevent water sheeting, while minimizing the height of the spacer profile between the adjacent fill sheets 10, 9a, 9b of the fill packs 8 in the water flow direction or generally parallel to the vertical axis 22. The preferred spacers 16 have the teardrop or raindrop shape, but this shape is not limiting. For example, in an alternative preferred embodiment, the spacers 16 may have a generally rectangular shape (FIG. 6), or any shape which forms a contact feature with an adjacent spacer feature near the top of the connection, and slopes downward and away from the adjacent spacer 16 relative to the vertical axis 22. The adjacent spacers 16, 16a, 16b are preferably glued or otherwise secured together, such as by ultrasonic welding or mechanical joining, at the mating surfaces in the installed configuration to connect the fill sheets 10, 9a, 9b together, thereby forming the fill packs 8. The spacers 16, 16a, 16b are not limited to being glued or otherwise joined together in the installed configuration and may act exclusively as spacers to space the adjacent fill sheets 10, 9a, 9b relative to each other in the installed configuration, such as when the fill sheets 10, 9a, 9b hang from a rail adjacent to each other in the tower, but are not otherwise joined or connected at the spacers 16, 16a, 16b. In addition, the spacers 16, 16a, 16b may include connection features that secure the spacers 16, 16a, 16b together in the installed configuration or may be otherwise connected or joined together in the installed configuration, such as by ultrasonic welding, mechanical deformation, fastening or otherwise securing the mating spacers 16, 16a, 16b together in the installed configuration.

Referring to FIGS. 1-3C, structural support is provided to the first preferred fill sheets 10, 9a, 9b and fill packs 8 by the intake side ribs 24, the outlet side ribs 26 and the intermediate vertical ribs or supports 38, as well as the remaining body of the fill sheets 10, 9a, 9b. Each of the intake and outlet side ribs 24, 26 and the intermediate ribs 38 is preferably comprised of two substantially vertical support ribs 24a, 24b, 26a, 26b, 38a, 38b extending along the height of the fill sheet 10, 9a, 9b, generally parallel to the air intake side 10a and the air outlet side 10b. In the first preferred embodiment, the support ribs 24a, 24b, 26a, 26b, 38a, 38b are not fully vertical, but are oriented substantially parallel to the air intake and air outlet sides 10a, 10b of the fill sheets 9a, 9b, 10, such that the support ribs 24a, 24b, 26a, 26b, 38a, 38b are oriented generally at the pack angle Δ, Δ' of approximately five to ten (5-10) degrees relative to the vertical axis 22, but are not so limited and may be otherwise oriented and configured. The microstructure 11a of the heat transfer area 11 of each of the fill sheets 10, 9a, 9b is preferably comprised of angled bands of microstructure 11a in the herringbone arrangement, extending between at least the first structural intake and outlet side ribs 24b, 26a, respectively, in the heat transfer area 11. The preferred support ribs 24, 26, 38, including the intake side ribs 24, 24a, 24b, the outlet side ribs 26, 26a, 26b and the intermediate ribs 38, 38a, 38b, extend generally vertically along the fill sheet 10, 9a, 9b in the installed configuration. The ribs 24a, 24b, 26a, 26b, vary in height in an alternating pattern as they extend along the fill sheet 10, 9a, 9b from and between the top edge 28 and the bottom edge 30. In the preferred embodiment, the intake and outlet side ribs 24a, 24b, 26a, 26b alternate between a maximum height $H_x$ and a minimum height $H_n$. The pairs of first and second intake side ribs 24a, 24b of the intake side rib 24, the first and second outlet side ribs 26a, 26b of the outlet side rib 26, and the first and second intermediate supports 38a, 38b of the intermediate support 38 are designed such that there is preferably at least one rib or support 24a, 24b, 26a, 26b, 38a, 38b with a height, such as the rib maximum height $H_x$ extending past or being greater than the microstructure height $H_s$ of the microstructure 11a on any given position along the lengths of the individual ribs or supports 24, 26, 38 on the fill sheets 10, 9a, 9b.

In the first preferred embodiment, the first and second air intake ribs 24a, 24b are configured such that while the first air intake rib 24a has the maximum height $H_x$ that extends past or is greater than the microstructure height $H_s$ of the microstructure 11a and the second air intake rib 24b extends below or has the rib minimum height $H_n$ that is less than the microstructure height $H_s$ of the microstructure 11a. Similarly, the first and second outlet side ribs 26a, 26b are configured such that while the first outlet side rib 26a has the rib maximum height $H_x$ that extends past or is greater than the microstructure height $H_s$ of the microstructure 11a, the second outlet side rib 26b has the rib minimum height $H_n$ that dips below or is less than the microstructure height $H_s$ of the microstructure 11a. The first and second intermediate ribs or supports 38a, 38b are similarly configured in the first preferred embodiment in that the first and second intermediate ribs 38a, 38b are laterally spaced, but are differently configured in that the first intermediate rib 38a substantially ends at a height where the second intermediate rib 38b begins. There may be sections where both of the first and second inlet side ribs 24a, 24b, the first and second outlet side ribs 26a, 26b and the first and second intermediate ribs or supports 38a, 38b are taller than the surrounding microstructure 11a to provide additional support at the base of the fill sheets 10, 9a, 9b and fill packs 8, such as where the fill pack 8 meets the supporting structure underneath the fill pack 8 in an assembled configuration in the tower. The air intake and outlet ribs 24, 26 are, however, preferably configured such that when one of the pair of first and second ribs 24a, 24b, 26a, 26b, respectively, is at its greatest height relative to the microstructure 11a, the adjacent one of the pair of first and second ribs 24a, 24b, 26a, 26b, respectively, is at its smallest height or is generally below the height of the microstructure 11a and is substantially embedded in the microstructure 11a. The first and second ribs 24a, 24b, 26a, 26b, therefore, have alternating tapers between the top edge 28 and the bottom edge 30.

The intake side rib 24 and the outlet side rib 26 are not limited to extending from the top edge 28 to the bottom edge 30. The intake side rib 24 and the outlet side rib 26 may extend proximate to the top and bottom edges 28, 30 and may include some interruptions along their length, but the intake and outlet side ribs 24, 26 preferably extend to the top and bottom edges 28, 30 and are comprised of the alternately extending pairs of first and second ribs 24a, 24b, 26a, 26b that alternatively taper relative to each other. The intake and outlet side ribs 24, 26 extend to and between the top and bottom edges 28, 30 in the preferred embodiments. The intake and outlet side support ribs 24, 26 include the pairs of first and a second support ribs 24a, 24b, 26a, 26b. The first and second support ribs 24a, 24b, 26a, 26b are spaced laterally from each other along the lateral axis 20 and extend substantially parallel to the vertical axis 22 or the intake and outlet sides 10a, 10b. The intake and outlet side ribs 24, 26 have a first support rib portion 33 having a first support rib length or first support rib portion length $L_{r1}$. The first support ribs 24a, 26a include a first rib height and the second support ribs 24b, 26b include a second rib height. The first rib height is less than the microstructure height in the first support rib portion 33 and the second rib height is greater than the microstructure height in the first support rib portion 33. The intake and outlet side ribs 24, 26 of the first preferred embodiment also have a second support rib portion 35 having a second support rib length or second support rib portion length $L_{r2}$. The first rib height is greater than the microstructure height in the second support rib portion 35 and the second rib height is less than the microstructure height in the second support rib portion 35.

The intermediate rib 38 is alternatively constructed such that the first intermediate rib 38a extends from the top edge 28 approximately to a middle of the vertical height of the fill sheet 10 where the first intermediate rib 38a substantially ends and the second intermediate rib 38b starts and extends to the bottom edge 30. The ribs 24, 26, 38 are not limited to having these configurations and may be otherwise designed and configured to provide strength and stiffness to the fill sheet 10, such as switching the general configurations of the air intake and outlet ribs 24, 26 and the intermediate ribs 38 or configuring each of the ribs 24, 26, 38 substantially the same.

By alternating the height or positioning of the pairs of first and second ribs 24a, 24b, 26a, 26b of the inlet side and outlet side ribs 24, 26 and the intermediate ribs 38 so that the localized height of at least one of the pair of first and second ribs 24a, 24b, 26a, 26b, 38a, 38b is preferably greater, specifically at the maximum height $H_x$, than the microstructure height $H_s$ of the microstructure 11a for any position along the length of the ribs 24, 26, 38 on the fill sheets 10, 9a, 9b, it is ensured that each side of the fill sheet 10, 9a, 9b has at least one functioning stiffening member or rib 24, 26, 38 for all vertical positions along the air intake side and the air outlet side 10a, 10b, respectively, as well as in the intermediate area or offset 32 between the intake and outlet sides 10a, 10b, thereby limiting weak points or sections where the fill sheets 10, 9a, 9b may buckle. Additionally, the lower peak height sections of the pairs of first and second ribs 24a, 24b, 26a, 26b of the intake and outlet side ribs 24, 26, wherein the maximum height $H_x$ is present, allow the bands of overlapping microstructure 11a to stiffen the fill sheet 10, 9a, 9b in the air travel direction or generally parallel to the lateral axis 20 by creating minor corrugations which resist bending moment in the plane perpendicular to the applied force at the intake and outlet side ribs 24, 26. This configuration increases the rigidity of the fill sheets 10, 9a, 9b for handling and shipping. The configuration of the intake and outlet side ribs 24, 26 and the intermediate rib 38, wherein the full height rib sections or sections with the maximum rib height $H_x$ overlap before transitioning to the lower height rib sections or sections with the minimum rib height $H_n$ of the first and second ribs 24a, 24b, 26a, 26b, 38a, 38b, respectively, where load is transferred between the pairs of first and second ribs 24a, 24b, 26a, 26b, 38a, 38b of the intake and outlet side ribs 24, 26 and the intermediate ribs 38 strengthens and also adds support at the intake and outlet sides 10a, 10b and the intermediate portion of the fill sheets 10, 9a, 9b.

In the preferred embodiments, the maximum rib height $H_x$ is approximately four hundredths of an inch to three-quarters of an inch (0.04-0.75") or approximately one hundredth of an inch to one-quarter of an inch (0.01-0.25") greater than the microstructure height $H_s$. The maximum rib height $H_x$ of the stiffening members or ribs 24, 26, 38 is not limited to these particular heights and may be otherwise sized and configured based on the expected loading of the stiffening member ribs 24, 26, 38, external loading factors, designer preferences, size of the fill sheet 10, type of cooling medium employed and other design considerations. The maximum height $H_x$ of the support ribs 24, 26, 38, however, preferably falls within the preferred range such that the maximum height $H_x$ is greater than the microstructure height $H_s$ in desired sections or segments while the minimum rib height $H_n$ is less than the microstructure height $H_s$ and the maximum rib height $H_x$. In the preferred embodiments, the minimum rib height $H_n$ is approximately zero to one-half inch (0-0.5") or smaller than the microstructure height $H_s$ of the particular fill sheet 10. The minimum rib height $H_n$ of the stiffening members or ribs 24, 26, 38 is not limited to these particular heights and may be otherwise sized and configured based on the expected loading of the stiffening member ribs 24, 26, 38, external loading factors, designer preferences, size of the fill sheet 10, type of cooling medium employed and other design considerations. The minimum rib height $H_n$ preferably falls within the preferred range such that the minimum rib height is less than the microstructure height $H_s$ in desired sections or segments. For example, the minimum rib height $H_n$ is about half or less than half of the microstructure height $H_s$ and the microstructure height $H_s$ is slightly greater than half the maximum rib height $H_x$ in the first preferred embodiment (See FIG. 2D). The minimum rib height $H_n$ may also be approximately zero, as is shown at the lower portion of the first intermediate rib 38a and the upper portion of the second intermediate rib 38b of the first preferred fill sheet 10 (See FIG. 1).

In the first preferred embodiment, the first intermediate rib 38a includes a top intermediate rib end 39a and a first intermediate rib end 39b and the second intermediate rib 38b includes a second intermediate rib end 39c and a third intermediate rib end 39d. The first intermediate rib end 39b is positioned proximate the second intermediate rib end 39c on the fill sheets 10, 9a, 9b. The first intermediate rib 38a or the second intermediate rib 38b is intersected by the lateral axis 20 between the top intermediate rib end 39a and the third intermediate rib end 39d, meaning the first intermediate rib 38a or the second intermediate rib 38b are intersected by the lateral axis 20 at generally any location along the height of the fill sheets 10, 9a, 9b between the top intermediate rib end 39a and the third intermediate rib end 39d. In the first preferred embodiment, the lateral axis 20 preferably intersects the first intermediate rib 38a or the second intermediate rib 38b at any location between the top edge 28 and the bottom edge 30, as the first intermediate rib 38a generally extends from the top edge 28 to a central portion of the fill sheet 10, 9a, 9b and the second intermediate rib 38b generally extends from the central portion of the fill sheet 10, 9a, 9b, where the first intermediate rib end 39b is positioned proximate the second intermediate rib end 39c, to the bottom edge 30. The first and second intermediate ribs 38a, 38b are not limited to this preferred configuration and the first and second intermediate ribs 38a, 38b may be separated into multiple segments, preferably such that at least one of the segments of the first and second intermediate ribs 38a, 38b is intersected by the lateral axis 20 at generally any location along the height of the fill sheets 10, 9a, 9b, as is described in further detail below with respect to the intake and outlet side ribs 24, 26.

The first and second inlet and outlet side ribs 24a, 26a, 24b, 26b of the first preferred embodiment are comprised of a plurality of rib segments 70a, 70b, 70c, 70d, 80a, 80b, 80c, 80d, wherein the first inlet side rib 24a is comprised of a first inlet side rib segment 70a and a third inlet side rib segment 70b, the second inlet side rib 24b is comprised of a second inlet side rib segment 70c and a fourth inlet side rib segment 70d, the first outlet side rib 26a is comprised of a first outlet side rib segment 80a and a third outlet side rib segment 80b and the second outlet side rib 26b is comprised of a second outlet side rib segment 80c and a fourth outlet side rib segment 80d. The first inlet side rib segment 70a includes a top end 71a and a first end 71b and the third inlet side rib segment 70c includes a fourth end 71e and a fifth end 71f. The second inlet side rib segment 70b includes a second end 71c and a third end 71d and the fourth inlet side rib segment 70d includes a sixth end 71g and a seventh end 70h. The first outlet side rib segment 80a includes a top end 81a and a first end 81b and the third outlet side rib segment 80c includes a fourth end 81e and a fifth end 81f. The second outlet side rib segment 80b includes a second end 81c and a third end 81d and the fourth outlet side rib segment 80d includes a sixth end 81g and a seventh end 80h. The inlet side rib 24 and outlet side rib 26 are configured such that at least one of the pluralities of segments 70a, 70b, 70c, 70d, 80a, 80b, 80c, 80d is intersected by the lateral axis 20 at any position between the top ends 71a, 81a and the seventh ends 71h, 81h, respectively. In contrast to the first and second intermediate ribs 38a, 38b, the rib segments 70a, 70b, 70c, 70d, 80a, 80b, 80c, 80d somewhat overlap in the height direction or the water flow direction, such as between the third and fourth ends 71d, 81d, 71e, 81e and the first and second ends 71b, 81b, 71c, 81c, for example. The rib segments 70a, 70b, 70c, 70d, 80a, 80b, 80c, 80d are not so limited and may be configured without the overlaps in the height direction and may include additional or less segments, although preferably such that at least one of the rib segments 70a, 70b, 70c, 70d, 80a, 80b, 80c, 80d of each of the inlet side rib 24 and the outlet side rib 26, respectively, is intersected by the lateral axis 20 at any position between the top and bottom edges 28, 30. The inlet side ribs 24, the outlet side ribs 26 and the intermediate ribs 38, including the respective rib segments 38a, 38b, 70a, 70b, 70c, 70d, 80a, 80b, 80c, 80d, extend generally parallel to the vertical axis 22 or the intake and outlet sides 10a, 10b in the first preferred embodiment, but are not so limited and may be otherwise oriented and configured to provide strength and stiffness to the fill sheets 9a, 9b, 10.

Figure 2:
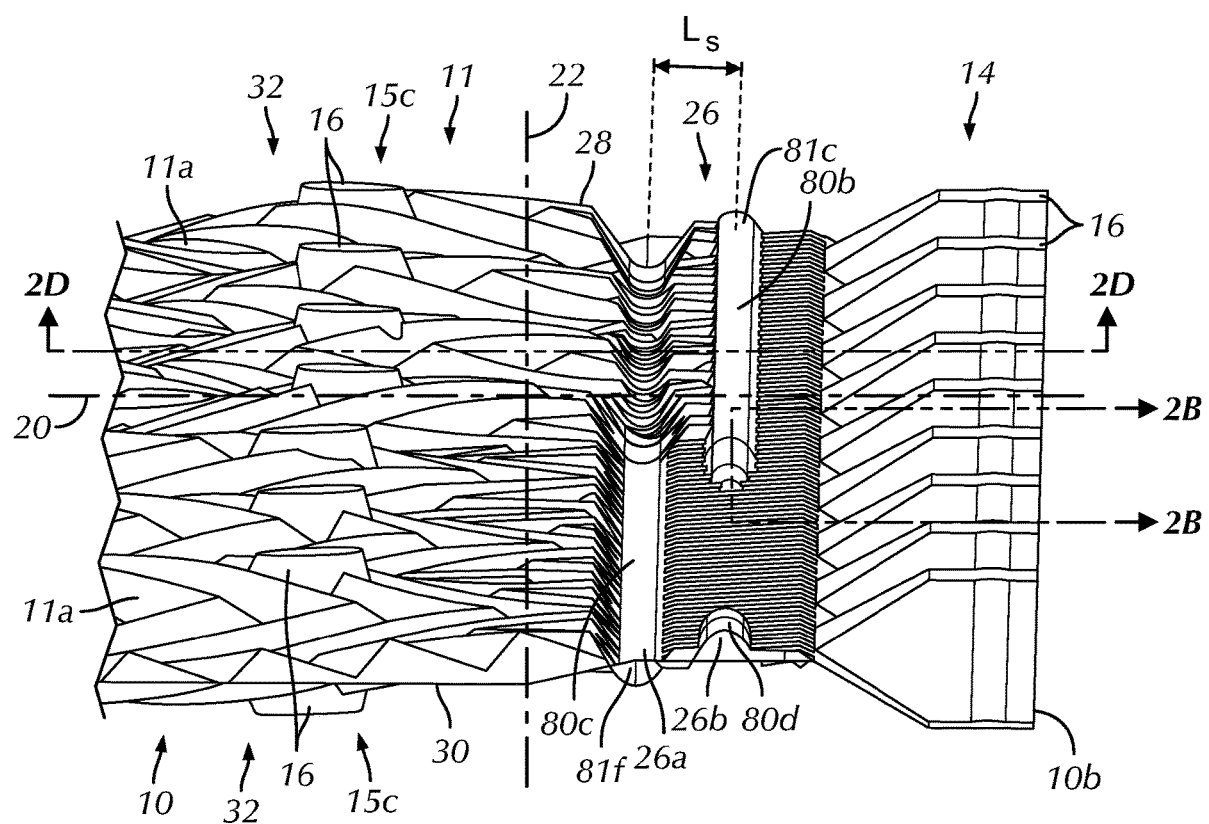
FIG. 2 is a bottom perspective view of a portion of an air outlet section of the fill sheet of FIG. 1, taken generally rearwardly of the line 2-2 of FIG. 1.
Figure 2A:
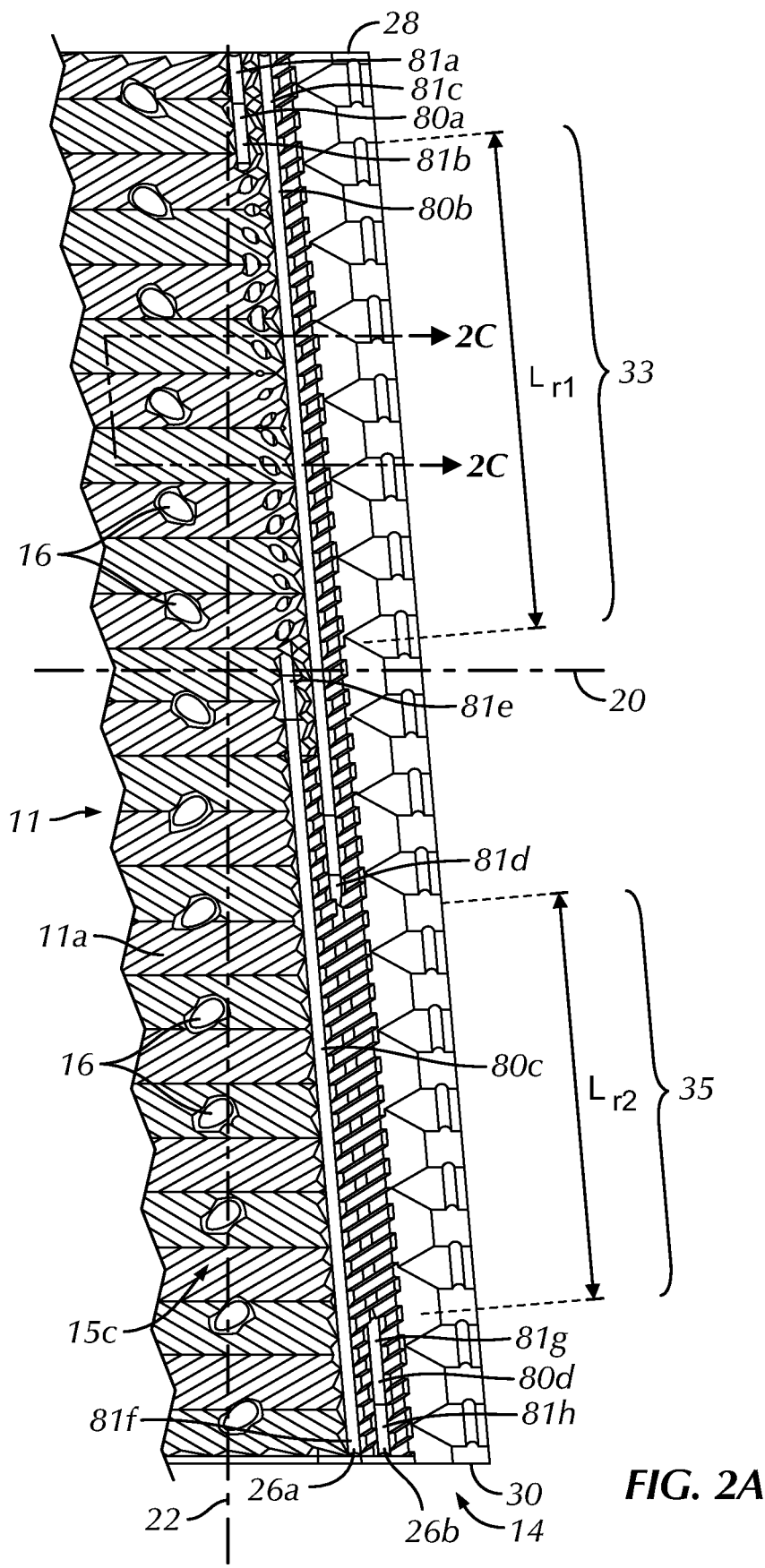
FIG. 2A is a front elevational view of the portion of the air outlet section of the fill sheet of FIG. 2.
Figure 2B:
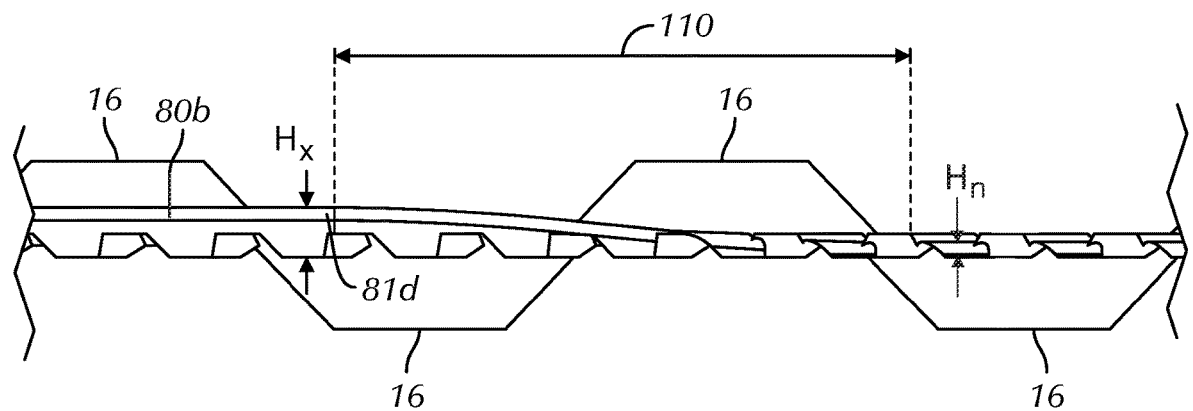
FIG. 2B is a cross-sectional view of a portion of the fill sheet of FIG. 1, taken along line 2B-2B of FIG. 2.
Figure 2C:
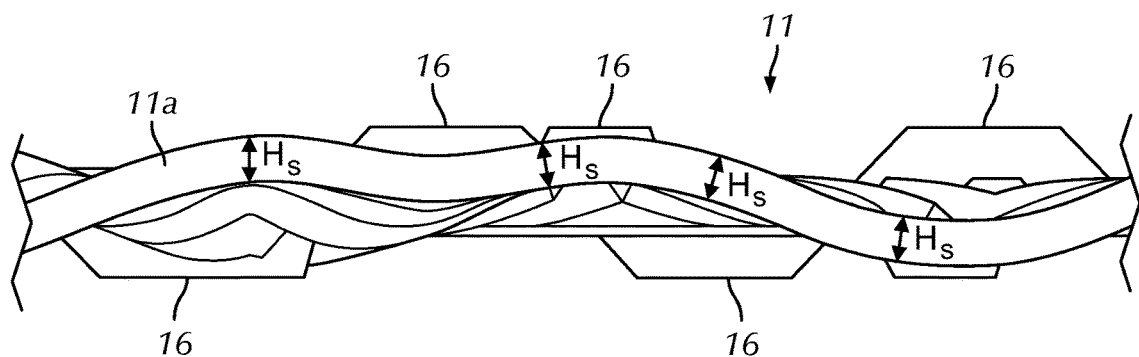
FIG. 2C is a cross-sectional view of a portion of the fill sheet of FIG. 1, taken along line 2C-2C of FIG. 2A.
Figure 2D:
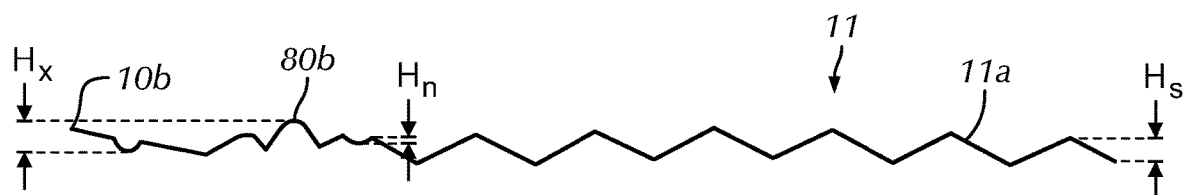
FIG. 2D is a cross-sectional line view of the fill sheet of FIG. 1, taken along line 2D-2D of FIG. 2.

In the preferred embodiments, the inlet side rib 24, the outlet side rib 26 and the intermediate rib 38 include the adjacent first and second inlet side ribs 24a, 24b, the first and second outlet side ribs 26a, 26b and the first and second intermediate ribs 38a, 38b, respectively. The pairs of the first and second inlet side ribs 24a, 24b, the first and second outlet side ribs 26a, 26b and the first and second intermediate ribs 38a, 38b are spaced at a lateral spacing $S_L$ that is preferably between one-quarter and two inches (¼-2"). The lateral spacing $S_L$ is not limited to being between one-quarter and two inches (¼-2") and may be otherwise sized and configured based on fill sheet 10 loading, external loading factors, designer preferences, size of the fill sheet 10 and other design considerations. The lateral spacing $S_L$ of the first and second outlet side ribs 26a, 26b is shown in FIG. 2 and the first and second inlet side ribs 24a, 24b and the first and second intermediate ribs 38a, 38b are also similarly designed and configured to have the lateral spacing $S_L$.

The inlet side rib 24 and the outlet side rib 26, including first and second inlet and outlet side ribs 24a, 24b, 26a, 26b and have variable heights between the top and bottom edges 28, 30. As a non-limiting example, the outlet side rib 26 and, specifically, the second outlet side rib 26b includes the second outlet side rib segment 80b and the fourth outlet side rib segment 80d with a reduced height portion or portion with the minimum rib height $H_n$ of the second outlet side rib 26b extending between the second outlet side rib segment 80b and the fourth outlet side rib segment 80d between the top edge 28 and the bottom edge 30. The second outlet side rib segment 80b preferably has the rib maximum height $H_x$ in the second outlet side rib segment 80b and the fourth outlet side rib segment 80d has the rib minimum height $H_n$ in a portion between the second and fourth outlet side rib segments 80b, 80d. The second outlet side rib 26b of the preferred embodiment also includes transition portions 110 where the second outlet side rib 26b transitions between the rib maximum height $H_x$ and the rib minimum height $H_n$ along the length of the second outlet side rib 26b. Each of the intake side ribs 24, 24a, 24b and the outlet side ribs 26, 26a, 26b are preferably similarly configured to the second outlet side rib 26b, with the rib segments or portions having the rib maximum height $H_x$, portions or segments having the rib minimum height $H_n$ and the transition portions 110 between the segments with the rib maximum and minimum heights $H_x$, $H_n$. In addition, the pairs of intake side ribs 24a, 24b and outlet side ribs 26a, 26b preferably have the transition portions 110 at generally the same lateral positions along the lateral axis 20 and opposing rib maximum and minimum heights $H_x$, $H_n$ along the lateral axis 20 for the adjacent intake side and outlet side ribs 24a, 24b, 26a, 26b, respectively. As a non-limiting example, the second outlet side rib segment 80b preferably has the rib maximum height $H_x$ along the lateral axis 20 while the adjacent portion or segment of the first outlet side rib 26a has the rib minimum height $H_n$.

The microstructure 11a in the heat transfer section 11 of the preferred embodiment has a microstructure height $H_s$. The minimum height or first rib height $H_n$ is less than the microstructure height $H_s$ in a first rib support portion, such as along the intake side and outlet side ribs 24a, 24b, 26a, 26b wherein the ribs 24a, 24b, 26a, 26b have the minimum height $H_n$. The maximum height $H_x$ is, conversely, greater than the microstructure height $H_s$ in a second rib support portion, such as along the intake side and outlet side ribs 24a, 24b, 26a, 26b wherein the ribs 24a, 24b, 26a, 26b have the maximum height $H_x$. The ribs 24a, 24b, 26a, 26b are not so limited and may have consistently smaller or greater heights than the microstructure height $H_s$, depending on design and requirement considerations of the particular fill sheet 10. The ribs 24a, 24b, 26a, 26b are not limited to the described configuration with the alternating maximum and minimum heights $H_x$, $H_n$ with the transition portions 110 therebetween and the microstructure height $H_s$ being between the maximum and minimum heights $H_x$, $H_n$ and may be otherwise designed and configured to support the fill sheets 10 based on designer preferences, loads being carried by the fill sheet 10, external factors of the operating environment or other factors that may drive the design and configuration of the intake side and outlet side ribs 24a, 24b, 26a, 26b. The intermediate rib 38 may be similarly designed and configured as the intake side and outlet side ribs 24a, 24b, 26a, 26b with the maximum and minimum heights $H_x$, $H_n$ and the microstructure height $H_s$ sized therebetween, but is similarly not so limited, as is described herein. In addition, in the preferred embodiments, the intake side and outlet side ribs 24a, 24b, 26a, 26b and the intermediate rib 38 has a generally arcuate-shaped cross-section. The intake side and outlet side ribs 24a, 24b, 26a, 26b and the intermediate rib 38 are not limited to having the arcuate-shaped cross-section and may have alternative cross-sectional shapes, such as solid, squared, triangular or other shapes, as long as the intake side and outlet side ribs 24a, 24b, 26a, 26b and the intermediate rib 38 are able to perform the preferred functions and withstand the normal operating conditions of the intake side and outlet side ribs 24a, 24b, 26a, 26b and the intermediate rib 38, as is described herein.

The preferred intake side and outlet side ribs 24a, 24b, 26a, 26b include the transition portions 110, which has a substantially consistent first taper, therein the intake side and outlet side ribs 24a, 24b, 26a, 26b transition from the minimum or first rib height $H_n$ to the maximum or second rib height $H_x$. The transition portions 110 are not limited to having the substantially consistent first taper and may have staged, stepped, sudden or otherwise inconsistent tapers between various heights along their length, but the preferred intake side and outlet side ribs 24a, 24b, 26a, 26b have the relatively consistent first taper to assist in transitioning loads, for manufacturability, to limit stress concentrations and for additional design considerations.

Referring to FIGS. 7-9, in the second preferred embodiment, the fill sheet 10' includes the integral drift eliminator 50. The integral drift eliminator 50 of the second preferred embodiment is comprised of an angled tube integral drift eliminator type, with a blocking structure or rib 100 at a drift eliminator inlet 102 where air flow enters the drift eliminator 50 from the heat transfer area 11' of the fill sheet 10' in the fill pack 8'. The blocking structure 100 is substantially comprised of a rib or wall in the preferred embodiment. The drift eliminator 50 is not limited to including the blocking rib 100 or to the blocking structure 100 being oriented generally vertically or to being a rib or wall. The blocking structure or rib 100 may be comprised of nearly any structure that provides an impediment or block for cooling fluid flowing directly into the drift eliminator 50 and facilitates drip formation at the inlet 102, preferably on or proximate to the blocking structure 100 so that the cooling fluid drips do not form deep into the drift eliminator 50. The cooling fluid is then able to drain back into the heat transfer area 11' before exiting the drift eliminator 50 and being lost from the cooling tower.

The blocking structure 100 preferably provides a block to drift, typically comprised of cooled water droplets or cooling fluid, or formation of cooling fluid drips at the inlet 102 so that the cooling fluid does not flow deep into the drift eliminator 50. Formation of drips at the inlet 102 generally prevents the fluid from flowing deep into the drift eliminator 50, potentially escaping into the drift eliminator 50 and out of the heat transfer area 11'. The cooling fluid captured at the inlet 102 of the drift 50 is preferably, ultimately maintained in the heat transfer area 11' for further dissipation of heat and eventually into a catch basin (not shown) below the fill pack 8' or the individual fill sheets 9a, 9b, 10 in the tower (not shown). To prevent the cooled water or cooling fluid film that is flowing through the fill pack 8' from travelling up and out of the tubes 104 of the drift eliminator 50 and out of the air outlet side 10b' of the fill pack 8', the blocking structure 100 is added at the drift eliminator inlet 102 which acts as a barrier for the water film and a drip formation area to limit flow of the cooling fluid deep into the drift 50. As the water or cooling fluid film reaches the blocking structure 100, the film forms drips which enter the airstream near the drift eliminator inlet 102, rather than farther into the drift eliminator tube 104 toward the air outlet side 10b. This change in the location of drip formation at the drift eliminator inlet 102 on the blocking structure 100 causes the droplet or drip to be introduced to the air stream in a location earlier in the transition of airflow direction, thereby causing the droplet or drip to impact a bottom tube wall of the drift eliminator tubes 104. The drip from the drift eliminator inlet 102 is thereby removed from the airstream to improve performance and effectiveness of the drift eliminator 50 and the fill pack 8', because the potentially lost cooled water or other cooling fluid film is blocked at the blocking rib 100 to facilitate drip formation at the inlet 102 to be captured by the drift eliminator tubes 104. The water or cooling fluid, therefore, flows back into the heat transfer area 11' through a drainage structure 106 for further dissipation of heat and eventually into the catch basin below the fill pack 8' during operation. In the second preferred embodiment, the blocking structure 100 is comprised of a pair of rounded ribs or walls measuring from approximately five hundredths of an inch to two tenths of an inch (0.05"-0.2") in height and one tenth to one-half inch (0.1"-0.5") in width. The blocking structure or ribs 100, which are formed at the drift eliminator inlets 102 of each of the fill sheets 10', 9a', 9b', align generally adjacent the top walls of each of the drift eliminator inlets 102 of the tubes 104 to act as a barrier for the water film to generally limit the water or other cooling fluid drift from moving into the tubes 104 or facilitate formation of drips to limit flow of the cooling fluid deep into the drift 50.

The second preferred embodiment of the fill sheet 10' also includes drainage structures 106 (FIG. 8) positioned inwardly toward a center of the sheet 10' relative to the drift eliminator 50. The drainage structures 106 provide a flowpath for the water or cooling fluid blocked by the blocking structure 100 to flow back into the heat transfer area 11' for further dissipation of heat. The second preferred fill sheet 10' is not limited to inclusion of the drainage structure 106 and may include alternatively configured features to direct the captured water or other cooling fluid back into the heat transfer area 11' or no features without significantly impacting the structure and operation of the second preferred fill sheet 10'.

Figure 10:
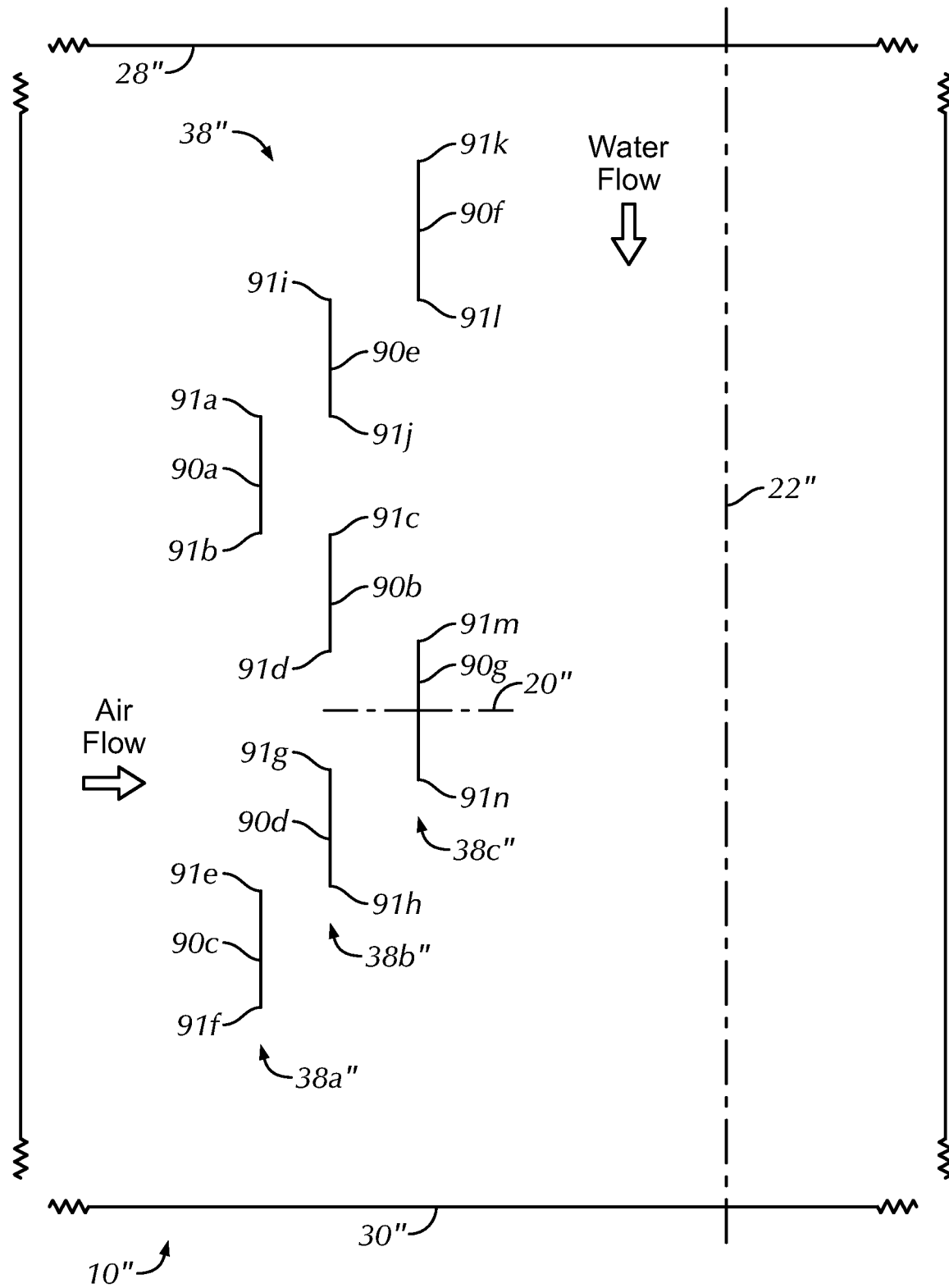
FIG. 10 is a front elevational representation of a fill sheet in accordance with a third preferred embodiment of the present invention.

Referring to FIG. 10, in a third preferred embodiment, a fill sheet 10" has similar features compared to the first and second preferred fill sheets 10, 10' and the same reference numerals are utilized to identify similar or the same features, with a double prime symbol (") utilized to distinguish the features of the third preferred embodiment from the first and second preferred embodiments. The third preferred fill sheet 10" includes an intermediate rib 38" including first, second and third intermediate ribs 38a", 38b", 38c". Each of the first, second and third intermediate ribs 38a", 38b", 38c" are laterally spaced from each other and include intermediate rib segments 90a, 90b, 90c, 90d, 90e, 90f, 90g that extend generally vertically or parallel to the vertical axis 22" to provide strength and stiffness to the third preferred fill sheet 10".

In the third preferred embodiment, the first intermediate rib 38a" includes first and third intermediate rib segments 90a, 90c, the second intermediate rib 38b" includes second, fourth and fifth intermediate rib segments 90b, 90d, 90e and the third intermediate rib 38c" includes sixth and seventh intermediate rib segments 90f, 90g. The first intermediate rib segment 90a includes top and first ends 91a, 91b and the second intermediate rib segment 90b includes second and third ends 91c, 91d. The first end 91a of the first intermediate rib segment 90a is positioned proximate the second end 91c of the second intermediate rib segment 90b such that at least one of the first and second intermediate ribs 90a, 90b is intersected by the lateral axis 20" between the top end 91a and the third end 91d, meaning there is generally not an interruption of the first and second intermediate rib segments 90a, 90b where the lateral axis 20" would not intersect either the first or the second intermediate rib segment 90a, 90b between the top end 91a and the third end 91d. All of the plurality of intermediate rib segments 90a, 90b, 90c, 90d, 90e, 90f, 90g are similarly arranged and configured such that the lateral axis 20" intersects at least one of the plurality of intermediate rib segments 90a, 90b, 90c, 90d, 90e, 90f, 90g between an end of the intermediate rib segment that is closest to the top edge 28" of the fill sheet 10", which is a tenth end 91k of a sixth intermediate rib segment 90f in the third preferred embodiment, and an end of the intermediate rib segment that is closest to the bottom edge 30", which is a fifth end 91f of a third intermediate rib segment 90c in the third preferred embodiment. In the third preferred embodiment, the third intermediate rib segment 90c includes a fourth end 91e and a fifth end 91f, the fourth intermediate rib segment 90d includes a sixth end 91g and a seventh end 91h, the fifth intermediate rib segment 90e includes an eighth end 91i and a ninth end 91j, the sixth intermediate rib segment 90f includes a tenth end 91k and an eleventh end 91l and the seventh intermediate rib segment 90g includes a twelfth end 91m and a thirteenth end 91n. To maintain strength and stiffness of the third preferred intermediate rib 38" the tenth end 91k is positioned proximate the top end 28", the eleventh end 91l is positioned proximate the eighth end 91i, the ninth end 91j is positioned proximate the top end 91a, the first end 91b is positioned proximate the second end 91c, the third end 91d is positioned proximate the twelfth end 91m, the thirteen end 91n is positioned proximate the sixth end 91g, the seventh end 91h is positioned proximate the fourth end 91e and the fifth end 91f is positioned proximate the bottom edge 30". The third preferred intermediate rib 38", therefore, extends generally vertically or parallel to the vertical axis 22" or to the intake and outlet sides 10a, 10b such that the lateral axis 20" intersects at least one of the plurality of intermediate rib segments 90a, 90b, 90c, 90d, 90e, 90f, 90g between the tenth end 91k and the fifth end 91f. The sixth intermediate rib segment 90f and the third intermediate rib segment 90c are spaced from the top and bottom edges 28", 30", but are not so limited and may extend to the top and bottom edges 28", 30" or closer to the top and bottom edges 28", 30", respectively.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the present disclosure.

We claim:

1. A fill sheet for cooling heat transfer fluid in a cooling tower when arranged into fill packs comprised of pluralities of fill sheets, the fill sheet comprising:
   an air intake end;
   an air outlet end positioned opposite the air intake end along a lateral axis;
   a top edge connecting the air intake end and the air outlet end;
   a bottom edge connecting the air intake end and the air outlet end, the bottom edge positioned opposite the top edge along a vertical axis; and a plurality of spacers extending from a heat transfer area of the fill sheet between the air intake end, the air outlet end, the top edge and the bottom edge, the plurality of spacers including a first spacer having a first head end and a first tail end, the first head end positioned closer to the top edge than the first tail end, the first spacer defining a first spacer axis, the first spacer axis defining a first acute spacer angle with the lateral axis, the plurality of spacers including a second spacer having a second head end and a second tail end, the first spacer being comprised of a first glue boss and the second spacer being comprised of a second glue boss, the second head end positioned closer to the top edge than the first tail end, the second spacer defining a second spacer axis, the second spacer axis defining a second acute spacer angle with the lateral axis, the first spacer axis extending at an opposite side of the vertical axis relative to the second spacer axis.

2. The fill sheet of claim 1, wherein the first spacer angle is ten to eighty degrees (10-80°).

3. The fill sheet of claim 2, wherein the first spacer angle is thirty-five degrees (35°).

4. The fill sheet of claim 1, wherein the first spacer extends from a valley of the fill sheet.

5. The fill sheet of claim 1, wherein the first spacer has a generally teardrop shape with a rounded first tail end and a generally semi-circular first head end.

6. The fill sheet of claim 1, further comprising:
a microstructure defined on the heat transfer area, the first spacer having a first connection surface, the first connection surface spaced at a greater height than the microstructure.

7. A fill pack for cooling heat transfer fluid in a cooling tower, the fill pack comprising:
a first fill sheet having a first top edge, a first bottom edge and a first heat transfer area between the first top edge and the first bottom edge, a first plurality of spacers extending generally perpendicularly relative to a first sheet plane from the first fill sheet, the first plurality of spacers including a first spacer having a first head end and a first tail end, the first head end positioned closer to the first top edge than the first tail end; and
a second fill sheet having a second top edge, a second bottom edge and a second heat transfer area between the second top edge and the second bottom edge, a second plurality of spacers extending generally perpendicularly relative to a second sheet plane from the second fill sheet, the second plurality of spacers including a second spacer having a second head end and a second tail end, the second head end positioned closer to the second top edge than the second tail end, the first head end positioned proximate the second head end in an installed configuration, a vertical axis defined generally perpendicularly relative to the first and second top edges and the first and second bottom edges, the first tail end extending toward an opposite side of the vertical axis relative to the second tail end resulting in mis-alignment of the first tail end and the second tail end in the installed configuration.

8. The fill pack of claim 7, wherein the first spacer defines a first spacer axis and the second spacer defines a second spacer axis, a lateral axis defined generally perpendicular relative to the vertical axis and substantially parallel to the first and second top edges, the first spacer axis and the lateral axis defining a first spacer angle and the second spacer axis and the lateral axis defining a second spacer angle, the first and second spacer angles being acute angles.

9. The fill pack of claim 8, wherein the first and second spacer angles are between thirty and forty degrees (30-40°).

10. The fill pack of claim 8, wherein the first and second spacer angles are equivalent.

11. The fill pack of claim 8, wherein the first and second spacer angles are approximately thirty-five degrees (35°).

12. The fill pack of claim 7, wherein the first and second spacers have a generally teardrop shape.

13. The fill pack of claim 7, wherein the first and second spacers are comprised of first and second glue bosses, the first and second glue bosses being bonded to each other in the installed configuration.

14. The fill pack of claim 7, wherein the first and second spacers have a generally rectangular shape.

15. The fill pack of claim 7, wherein the first spacer is positioned adjacent to the second spacer in the installed configuration, the positioning of the first and second spacers facilitating spacing of the first fill sheet relative to the second fill sheet in the installed configuration.

16. A fill pack for cooling heat transfer fluid in a cooling tower, the fill pack comprising:
a first fill sheet having a first air intake side, a first top edge, a first air outlet side and a first heat transfer area between the first air intake side and the first air outlet side;
a second fill sheet having a second air intake side, a second top edge, a second air outlet side and a second heat transfer area between the second air intake side and the second air outlet side; and
an integral drift eliminator associated with the first and second air outlet sides in an installed configuration, the drift eliminator defining a plurality of tubes with a drift eliminator inlet positioned proximate the first and second heat transfer areas and a drift eliminator outlet spaced away from the first and second heat transfer areas, the plurality of tubes extending generally toward the first and second top edges from the drift eliminator inlet toward the drift eliminator outlet, each of the plurality of tubes including a blocking structure on each of the plurality of tubes at the drift eliminator inlet configured to block a film of the heat transfer fluid at the drift eliminator inlet to promote droplet formation and direct the heat transfer fluid back into the heat transfer area.

17. The fill pack of claim 16, wherein the plurality tubes have an arcuate shape.

18. The fill pack of claim 16, the blocking structure is comprised of a pair of rounded ribs measuring from approximately five hundredths of an inch to two tenths of an inch (0.05"-0.2") in height and one tenth to one-half inch (0.1"-0.5") in width.

* * * * *